United States Patent
Patten et al.

(10) Patent No.: US 10,149,006 B2
(45) Date of Patent: Dec. 4, 2018

(54) MEDIA INSERTION SYSTEM

(75) Inventors: Christopher John Patten, Isleworth (GB); Christopher David Caines, Isleworth (GB); Jeffrey Russell Eales, Isleworth (GB); Herve Murret-Labarthe, Isleworth (GB)

(73) Assignee: Sky CP Limited (GB)

( * ) Notice: Subject to any disclaimer, the term of this patent is extended or adjusted under 35 U.S.C. 154(b) by 0 days.

(21) Appl. No.: 13/388,234

(22) PCT Filed: Aug. 2, 2010

(86) PCT No.: PCT/GB2010/051274
§ 371 (c)(1),
(2), (4) Date: Aug. 13, 2012

(87) PCT Pub. No.: WO2011/012909
PCT Pub. Date: Feb. 3, 2011

(65) Prior Publication Data
US 2012/0311649 A1     Dec. 6, 2012

(30) Foreign Application Priority Data
Jul. 31, 2009 (GB) .................................. 0913389.3
Feb. 23, 2010 (GB) .................................. 1003034.4
(Continued)

(51) Int. Cl.
H04N 21/274 (2011.01)
H04N 21/439 (2011.01)
(Continued)

(52) U.S. Cl.
CPC .......... *H04N 21/439* (2013.01); *G06Q 30/02* (2013.01); *H04N 7/165* (2013.01);
(Continued)

(58) Field of Classification Search
CPC ....... H04N 21/23424; H04N 21/26233; H04N 21/26258; H04N 21/2668; H04N 21/44016; H04N 21/812
See application file for complete search history.

(56) References Cited

U.S. PATENT DOCUMENTS

2002/0083443 A1* 6/2002 Eldering et al. ................ 725/34
2003/0030887 A1  2/2003 Lee et al.
(Continued)

FOREIGN PATENT DOCUMENTS

EP       0719053 A2    6/1996
JP       2007/195208 A    8/2007
(Continued)

OTHER PUBLICATIONS

Hurst N. et al., "MPEG Splicing: A New Standard for Television—SMPTE 312M", SMPTE Journal, SMPTE Inc. Scarsdale, N.Y., US, Nov. 1, 1998, 107(11):978-988, XP000804761, ISSN: 0036-1682.
(Continued)

*Primary Examiner* — Rong Le
(74) *Attorney, Agent, or Firm* — Katten Muchin Rosenman LLP

(57) ABSTRACT

In a substitutional media system, one of a set of media items is selected at a program receiver for output within a predefined programming slot, based on profile data available at the receiver. Sets of the media items are scheduled to slots according to one or more constraints pertaining to that slot and/or to media items scheduled to other slots. The receiver may select a media item for output in a slot by resolving constraints with media items scheduled to other slots, or selected for output in other slots.

31 Claims, 15 Drawing Sheets

(30) Foreign Application Priority Data

Mar. 22, 2010 (GB) .................................. 1004738.9
May 26, 2010 (GB) .................................. 1008787.2

(51) Int. Cl.
| | |
|---|---|
| G06Q 30/02 | (2012.01) |
| H04N 7/16 | (2011.01) |
| H04N 21/234 | (2011.01) |
| H04N 21/258 | (2011.01) |
| H04N 21/262 | (2011.01) |
| H04N 21/2668 | (2011.01) |
| H04N 21/4147 | (2011.01) |
| H04N 21/44 | (2011.01) |
| H04N 21/442 | (2011.01) |
| H04N 21/475 | (2011.01) |
| H04N 21/81 | (2011.01) |
| H04N 21/43 | (2011.01) |

(52) U.S. Cl.
CPC . *H04N 21/23424* (2013.01); *H04N 21/25883* (2013.01); *H04N 21/2668* (2013.01); *H04N 21/26233* (2013.01); *H04N 21/26258* (2013.01); *H04N 21/4147* (2013.01); *H04N 21/4302* (2013.01); *H04N 21/442* (2013.01); *H04N 21/44016* (2013.01); *H04N 21/44222* (2013.01); *H04N 21/4755* (2013.01); *H04N 21/812* (2013.01)

(56) References Cited

U.S. PATENT DOCUMENTS

| | | | |
|---|---|---|---|
| 2003/0058707 A1 | 3/2003 | Dilger et al. | |
| 2003/0123556 A1 | 7/2003 | Komori | |
| 2007/0266400 A1 | 11/2007 | Rogers et al. | |
| 2008/0046924 A1* | 2/2008 | Hood | 725/36 |
| 2010/0251289 A1* | 9/2010 | Agarwal et al. | 725/34 |

FOREIGN PATENT DOCUMENTS

| | | |
|---|---|---|
| WO | 1996/037996 A1 | 11/1996 |
| WO | 1997/023997 A1 | 7/1997 |
| WO | 2001/011865 A1 | 2/2001 |
| WO | 2003/053056 A1 | 6/2003 |
| WO | 2005/025227 A1 | 3/2005 |
| WO | 2005/086865 A2 | 9/2005 |
| WO | 2006/125971 A1 | 11/2006 |
| WO | 2006/125999 A1 | 11/2006 |
| WO | 2008/013707 A2 | 1/2008 |
| WO | 2008/078093 A1 | 7/2008 |

OTHER PUBLICATIONS

Hurst N. et al., "Splicing FAQ—Frequently Asked Questions—about MPEG Splicing and the SMPTE Splicing Standard", Internet Citation, Dec. 8, 1997, XP002292038, Retrieved from the Internet: URLhttp://www.mpeg.org/MPEG/splicing-FAQ.html [retrieved Apr. 30, 2013].

International Preliminary Report on Patentability and Written Opinion dated Jan. 31, 2012 for International Application No. PCT/GB2010/051274, 11 pages.

International Search Report dated Feb. 22, 2011 for International Application No. PCT/GB2010/051274, 7 pages.

Weiss S. M., "Switching Facilities in MPEG-2: Necessary But Not Sufficient", SMPTE Journal, SMPTE Inc. Scarsdale, N.Y., US, Dec. 1, 1995, 104(12):788-802, XP000543847, ISSN: 0036-1682.

Examination Report dated Oct. 8, 2014 for Australian Patent Application No. 2010277397, 5 pages.

Office Action dated Apr. 20, 2015 for Israeli Patent Application No. 217819, 3 pages.

Mediatel: "Connected Consumer Awards 2014—the winners!" Mar. 13, 2014, David Pidgeon, https://mediatel.co.uk/newsline/2014/03/13/connected-consumer-awards-2014-the-winners/.

Connected TV World Summit: "Videonet Connected TV Awards 2014" https://connectedtvsummit.com/2014-award-winners/.

Durrani, Arif: "Media Week Awards 2014 celebrates outstanding talent and creativity" Oct. 24, 2014, http://www.campaignlive.co.uk/article/media-week-awards-2014-celebrates-outstanding-talent-creativity/1318803.

Mediatel: "Media Research Awards 2015: Sky Media takes Grand Prix" Feb. 11, 2015, Newsline Staff, https://events.mediatel.co.uk/event/2015-02-the-mediatel-media-research-awards-2015.

Mediatel: "Media Research Awards 2017: Newsworks wins Grand Prix" Feb. 23, 2017, Newsline Staff, https://mediatel.co.uk/newsline/2017/02/23/media-research-awards-2017-newsworks-wins-grand-prix/.

* cited by examiner

MEDIA INSERTION SYSTEM

FIELD OF THE INVENTION

The present invention relates to a programme distribution system with local media insertion.

BACKGROUND OF THE INVENTION

Media insertion systems involve the selection of a media item for output by a receiver during a predefined slot in a schedule either at time of broadcast or when playing back recorded or video-on-demand (VOD) programming, such as from a Personal Video Recorder (PVR). Where the programming includes content during the slot which may be replaced by media insertion, this replacement in referred to as media substitution. Such systems may be used for targeted substitutional advertising (TSA), where an advertisement (a commercial in US English) is selected for output based on a predefined user profile, without specific selection of the advertisement by the user. In a broadcast example, the user experience is similar to watching a broadcast with an advertising break, but the advertisements are tailored to the user profile by means of a selection made at the broadcast receiver. A default media item may be included in the broadcast programming during the slot, for output by receivers in which media substitution is not enabled, or by receivers not targeted by the substitution.

Attempts have been made to standardise aspects of media insertion. For example, the Society of Cable Telecommunications Engineers standard SCTE 130-1 2008 defines a framework of XML interface standards for communication between different components of a substitutional advertising platform. The Advanced Advertising 1.0 specification was announced by Canoe Ventures LLC on 30 Mar. 2009.

However, the practical implementation of a media substitution or insertion system raises many challenges. One problem is the complexity of scheduling media items that are subject to constraints, for example relating to other media items to be scheduled or to scheduled programmes, particularly when output proximate or adjacent to each other. Constraints in current linear (i.e. non-substitutional) advertisement scheduling systems already involve a considerable level of complexity. For example, the applicant's Landmark 2 system requires a dedicated state of the art computer system to perform the constraint satisfaction necessary to manage advertisement scheduling in over 200 channels. Performing substitutional booking within the same system context as linear booking would involve an unmanageable level of complexity if constraints were to be satisfied between all possible substitutional options. One specific problem is the limited processing power available at the receiver to select substitutional options.

In a centralised broadcast system, such as a satellite broadcast system, regional variations in the media items must be handled by means of substitution or insertion, rather than by transmitting regional variations only from the corresponding regional headends.

Another problem with media substitution involves determination of which media items have been output at the receiver. Currently, such information is obtained from survey data from a relatively small number of users, although more accurate information could be provided over a return link. However, the receiver may not have a return link available, or it may be desirable to avoid using the return link, for example where the return channel is over a dial-up modem connectable to the user's main telephone line. Users may also be averse to systems which report specific user behaviour to a remote site.

Another problem involves the method of selecting the substitutional media items to be output by the receiver, according to the user profile. It would be desirable for the selection criteria to be as flexible as possible, but this would involve storing a large quantity of profile data at the receiver. Furthermore, the broadcast receiver may not be capable of applying complex selection rules to determine which media item to output.

Another problem involves controlling the probability that a particular media item or set of media items will be output by a particular receiver. In linear scheduling systems, predicted audience figures and profiles for a particular programme are used to select which advertisements should be scheduled in a break within or adjacent that programme. The predicted audience figures are provided in the UK by the Broadcasters' Audience Research Board (BARB). The probability of a particular advertisement being output by a particular receiver is simply determined by the probability of that receiver being tuned to the channel in which the advertisement is scheduled, during the time slot in which the advertisement is scheduled. That probability is a function of the audience segment to which the receiver belongs.

In a media substitution system, the probability of a particular substitutional advertisement being output by a particular receiver is also dependent on the probability of that substitutional advertisement being selected by the receiver. Although predicted audience figures may be broken down by audience segment, these segments may not correspond to the segments at which the different substitutional options are targeted. Therefore, predicted audience figures are less useful for scheduling substitutional media items than for scheduling linear media items.

It would therefore be desirable to control the delivery of substitutional media items so as to optimize the probability of a particular media item, addressed to a selected audience segment, being output by receivers falling within that audience segment.

Another problem arising from substitutional media insertion is the need to make the transition in an output stream between a broadcast or playback programme and a substitutional item as seamless as possible. Ideally, the transition should be imperceptible to the user, so that the user experience is indistinguishable from watching a media item, such as an advertisement, included as part of a broadcast or playback programme. However, the use of digitally encoded video and audio data presents particular problems in splicing a substitutional media item into an output stream.

Digital video broadcasts typically comply with the DVB standards, such as DVB-T for terrestrial and DVB-S for satellite, which specify the use of interframe video compression such as MPEG-2. Therefore, at least some of the video frames are encoded with reference to a preceding frame (P frames) or with reference to preceding and following frames (B frames). Splicing one video stream into another video stream may disrupt the encoding scheme, for example if a B frame of one stream is followed by a P or B frame of the other stream, such that severe decoding errors occur.

At least some of the video frames may have an associated time reference, such as the presentation time stamp (PTS) included in MPEG-2 video streams, to assist with audio synchronisation. The time reference of a broadcast stream may indicate the time of broadcast. However, a substitutional media item will typically have a completely different time reference from the broadcast or playback stream. When a substitutional media item is spliced into a broadcast stream, the resultant discontinuity in time references may cause problems in the audio and video decoders, such as loss of audio synchronisation or audio muting.

Audio decoding of substitutional content presents a particular problem, since audio decoding may be performed by an external decoder that is not aware of when splicing has occurred, and is not designed to handle spliced audio content. Any apparent errors in the audio stream caused by splicing will lead to unpredictable results at the audio decoder.

Another problem may incur in the indication of splice points to a broadcast encoder. The system upstream of the encoder indicates the splice points using a time reference, while the encoder encodes the splice point with reference to a specific video frame. Since the indicated time may not correspond precisely to the start of an encoded frame, there is an uncertainty of up to one frame period in the encoded position of the splice point.

The above problems are not confined to broadcast systems, since video on demand (VOD) and push video on demand systems (PVOD) may include substitutional content with a requested programme; see for example the applicant's patent publication WO 2008/078093 A1, concerning the linking of secondary assets, such as advertisements, with a primary asset, such as a requested programme.

STATEMENT OF THE INVENTION

According to one aspect of the present invention, there is provided a method of selecting a media item for output in programme slot at a programme receiver, the method comprising, at the receiver: receiving an indication of possible media items for output in that slot; and selecting up to one of the possible media items for output in the slot according to one or more constraints associated with one or more media items allocated to at least one other programme slot.

According to another aspect of the present invention, there is provided a media insertion method in which programming is received by a programme receiver and may be output substantially immediately by the receiver and/or recorded at the receiver for subsequent output, the programming having a break defined therein such that media stored at the receiver may be output during the break, wherein the break in output of the recorded programming is shorter than the break in output of the programming substantially immediately.

According to another aspect of the present invention, there is provided a media insertion method in which programming is received by a programme receiver and may be output substantially immediately by the receiver and/or recorded at the receiver for subsequent output, the programming having a break defined therein such that media stored at the receiver may be selectively output during the break, wherein the media selection options differ between the break in output of the recorded programming and the break in output of the programming substantially immediately.

According to another aspect of the present invention, there is provided a method of outputting an audiovisual substitutional media item within a media output stream at a media output device, wherein the media output stream comprises a video stream and an audio stream having mutually different frame rates, and the media output stream includes a video splice-in point referenced to a video frame of the video stream, the method comprising deriving an audio splice-in point as an audio frame of the media output stream at or immediately after the video splice-in point, and outputting the audio content of the substitutional media item from the audio splice-in point.

According to another aspect of the present invention, there is provided a method of outputting an audiovisual substitutional media item within a media output stream at a media output device, wherein the media output stream comprises a video stream and an audio stream having mutually different frame rates, wherein the audio content of the substitutional media item is output with a frame timing synchronised to the audio stream of the media output stream.

According to another aspect of the present invention, there is provided a method of outputting an audiovisual substitutional media item within a media output stream at a media output device, wherein the media output stream comprises a video stream and an audio stream, and the media output stream includes a splice-in point, wherein the audio content of the media output stream is decoded from encoded audio data and, if the encoded audio data for the media output stream immediately before the splice-in point arrives too late to be output before the audio content of the substitutional media item from the splice-in point, outputting dummy audio content prior to the splice-in point instead of the audio content of the media output stream.

According to another aspect of the present invention, there is provided a method of outputting an audiovisual substitutional media item within a media output stream at a media output device, wherein the media output stream comprises a video stream and an audio stream, and the media output stream includes a splice-in point and a splice-out point, the method comprising outputting dummy audio content subsequent to the audio content of the substitutional media item if the output of the audio content of the substitutional media item occurs before the splice-out point. The dummy audio content may comprise one or more audio frames synchronised with the audio stream of the media output stream.

According to another aspect of the present invention, there is provided a method of encoding a framed media stream at an encoder for broadcast at a headend, the encoded media output stream including a splice point message referenced to a frame of the media stream at a time indicated by a media scheduler, the method comprising synchronising the frame timing of the encoder to the timing of the media scheduler.

According to another aspect of the present invention, there is provided a media substitution system in which one of a set of media items is selected at a programme receiver for output within a predefined slot, based on profile data available at the receiver. Sets of the media items are scheduled to slots according to constraints relating to one or more attributes of subsets of the media items. The attributes pertaining to each of the subsets are aggregated and scheduling of the set is performed on the basis of the aggregated attributes of the subsets. In this way, the complexity of scheduling based on the individual attributes of subsets of the media items is avoided.

Media items may be selected for inclusion together in the same set on the basis of similarity of their individual attributes. In this way, the application of unnecessary constraints, that would not apply to scheduling of media items on an individual basis, is avoided. Conversely, media items may be selected for inclusion together in the same set on the basis of having widely differing individual attributes, on the basis that constraints based on the attributes of other sets of media items may be more easily satisfied against widely differing attributes of the current set.

Each of the media items has an associated segment definition, defining an associated set or range of receiver profile data values, which may be expressed as one or more rules and/or data. The receiver selects which media item to output based on a comparison between the segment definition and the profile data. Media items may be selected for inclusion in an aggregate set such that the segment definitions of the media items within the aggregate set do not overlap. In this way, each receiver will select no more than one media item for output from each aggregate set. Hence, selection of the media items output by a specific receiver is deterministic and does not require reporting of those specific items. The aspect of deterministic selection at the receiver, based on predetermined receiver profile data and non-overlapping segments, is considered to be independently inventive.

Alternatively, the segment definitions may be allowed to overlap, and a selection between multiple possible media items may be performed at the receiver based on priority levels associated with, and/or independent of, the predefined slot. This may allow improved targeting of audiences, for example by matching the expected audience profile of a programme with the segment definitions of the media items scheduled to the slot.

The selection between multiple possible media items may alternatively or additionally be based on time or frequency constraints, for example based on previous selections of media items by the receiver.

The selection between multiple possible media items may be made at least partly on a random or pseudo-random basis, optionally weighted based on one or more of the criteria mentioned above.

The receiver profile data may be varied by transmitting variable receiver profile data items to the receiver. The receiver profile data items may pertain to the segment definitions of a specific set of media items. In this way, segments can be defined flexibly, and may vary for each set of media items. The receiver profile data necessary to select a media item from a specific aggregate set may be communicated to the receiver, optionally in combination with segment definitions for determining the application of each segment to the profile data of the receiver. The receiver profile data may be derived from a profile database containing information relating to receivers and/or their associated users. In this way, the need to communicate large quantities of profile data to a receiver may be avoided; instead, the necessary profile data are communicated to the receiver only as they are needed. The profile data items may be customised to a specific set of media items, in which case the selection rule may be a simple matching rule, and which does not require complex processing by the receiver. Alternatively or additionally, a common set of profile data items may be reused between different sets of media items and their associated segment definitions, thereby avoiding the need to frequently communicate new profile data items.

BRIEF DESCRIPTION OF THE DRAWINGS

There now follows, by way of example only, a detailed description of embodiments of the present invention, with reference to the figures identified below.

DETAILED DESCRIPTION OF THE EMBODIMENTS

Media Substitution System Overview

Figure 1:
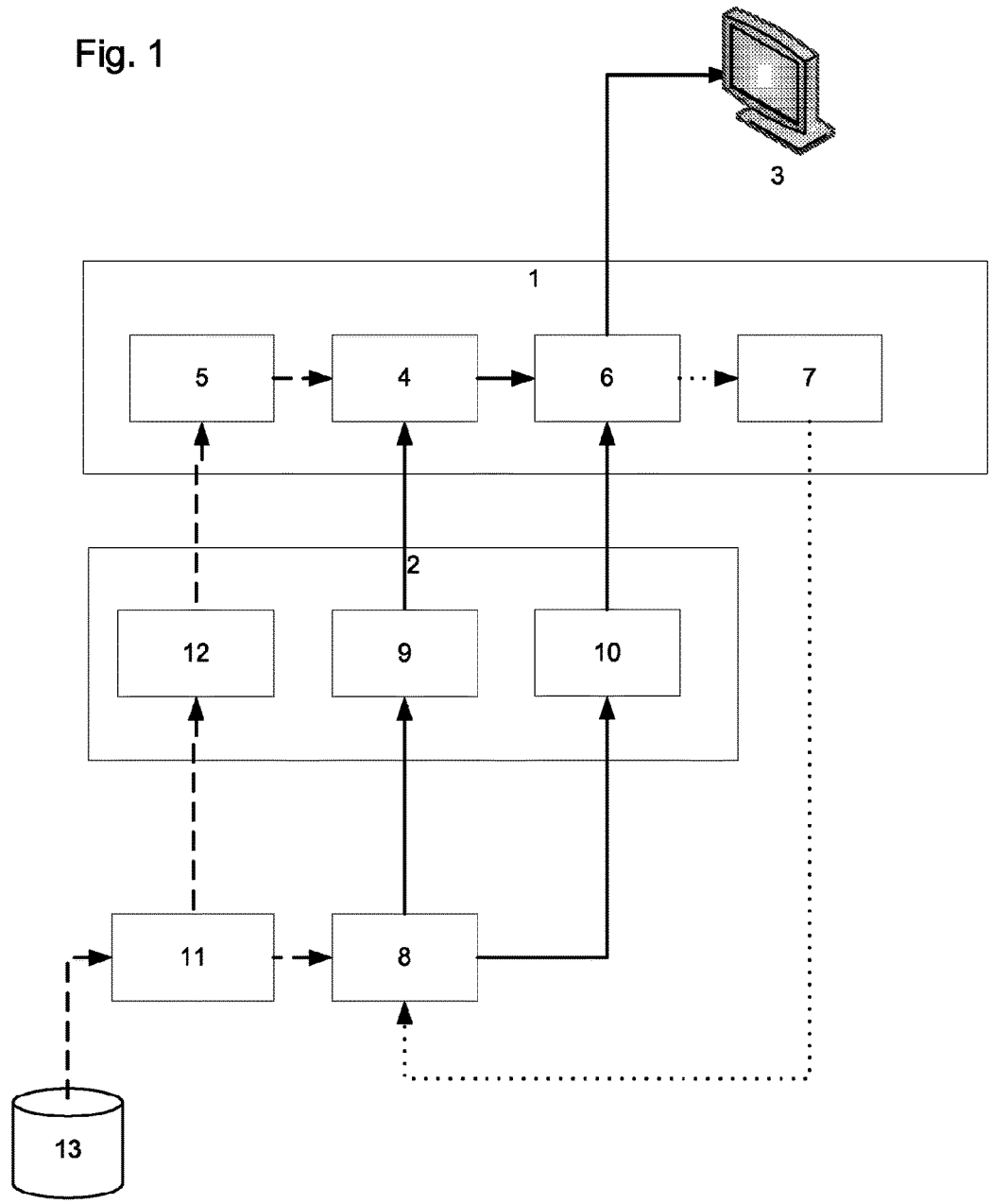
FIG. 1 is a schematic diagram of the main components of a media substitution system in an embodiment of the present invention.

FIG. 1 shows schematically the main components of a media substitution system in an embodiment of the present invention, in which the programmes are video broadcast programmes and the substitutional media items comprise advertising video clips.

A sample broadcast receiver 1 comprises a personal video recorder (PVR) arranged to receive broadcast channels from a head end 2 over a broadcast link, and to output at least one of the received broadcast channels to a video display 3. The receiver 1 stores profile data 5 identifying preferences and/or demographics of one or more users or subscribers associated with the receiver 1. The receiver 1 also stores media content 4, comprising substitutional media items and associated metadata. The media items may be received over the broadcast link or another communications network link, in advance of their scheduled broadcast time.

A media insertion function 6 detects the occurrence of a substitutional slot in a currently received broadcast programme, and may select a substitutional media item for output to the video display during the substitutional slot, in place of the linear media content on the broadcast channel, based on the profile data. The linear media content will be output by broadcast receivers for which substitution is not enabled, either because the receiver is not capable of media substitution or because media substitution is inhibited. The linear media content will also be output by receivers for which substitution is enabled, but the profile data does not match the segments of any of the substitutional media items for that substitutional slot, or the appropriate substitutional media item has not been received.

Optionally, the PVR may record viewing data 7 indicating the broadcast programmes and/or media items output for display by the receiver 1, for reporting purposes.

Descriptions of the media content 4 necessary for the receivers 1 are compiled by a central scheduling function 8, which determines the scheduling of the media content 4. The media content 4 is output to a media broadcast function 9 for broadcast to the receivers 1 in advance of the scheduled times of the media content. The scheduling function 8 also outputs linear media items for insertion in a broadcast programme schedule executed by a programme broadcast function 10.

All the substitutional media items for a substitutional slot should be broadcast before the occurrence of the substitutional slot in the broadcast schedule. In some circumstances, each item should be broadcast multiple times to maximize the chance that all items are received by most of the receivers 1, in case some of the receivers are occasionally switched off or unable to receive broadcasts. However, it is not essential that all substitutional options be received by all receivers, since the linear content broadcast during the slot may be output if the required substitutional option is unavailable.

The profile data 5 stored on the receiver 1 may be generated by a profile management function 11, and sent to the receiver 1 by a profile data transmission function 12 at the head end 2. The scheduling function 8 may receive the viewing data 7 from the receivers 1, and may be responsive to the viewing data 7 when scheduling substitutional and/or linear media items.

Substitutional Broadcast Method

Figure 2:
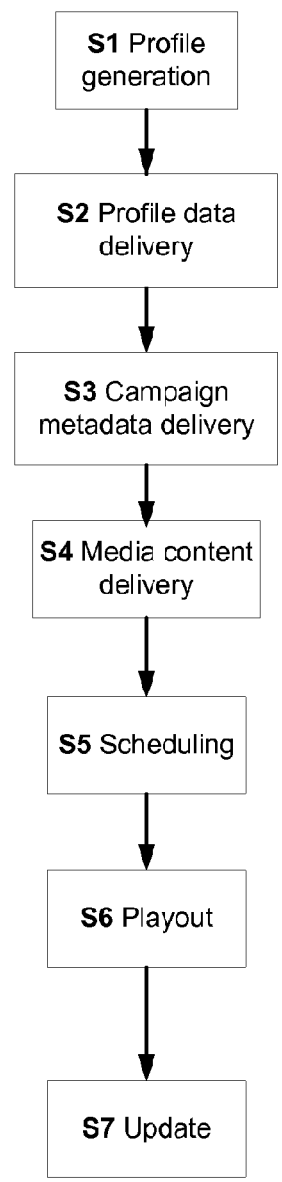
FIG. 2 is a flowchart of the steps involved in the operation of the media substitution system.

FIG. 2 represents the steps performed in a method of scheduling, delivering and displaying one or more substitutional advertising campaigns, in an embodiment of the invention. Each substitutional advertising campaign may comprise one or more media items, sometimes referred to as 'copy' or 'copy items', each media item being associated with a viewer profile segment defined by segment data and/or one or more segment rules associated with that item. For example, an advertising campaign for a range of cars may comprise a set of media items, each comprising an advertisement for a particular car in the range, designed to appeal to a segment of the market defined by the associated segment data and/or rule.

In the present embodiment the profile data 5 of each broadcast receiver 1 comprises a set of profile data items stored locally at the receiver. Each receiver 1 also has a unique identity, such as a subscriber card number (Subscriber ID) stored on a smart card accessible by the receiver 1. The profile management system 11 accesses a database of subscriber details 13 associated with the unique subscriber identities, including subscriber details provided when subscribing to the broadcast service, subscriber preferences provided via the receiver 1 or other communications link, and/or third party data which the subscriber has allowed to be used for this purpose. Hence, the database 13 stores a wealth of profile data items, which may be used to define profile data and/or segments. However, it would not be practicable for each broadcast receiver 1 to replicate all of its associated data items in the profile database 13, so as to be able to make a comparison with the profile segments of any particular campaign. Moreover, a predefined, fixed set of profile data items may require excessive processing by the receiver to identify whether the receiver 1 belongs to a particular segment. For example, a predefined profile data item may comprise a truncated postcode (used for example to determine a channel set—e.g. a bouquet or sub-bouquet—which the receiver 1 is enabled to receive), while a profile segment may be defined by a much larger region. To determine whether the truncated postcode corresponds to a particular region, the receiver 1 would need to obtain a list of truncated postcodes corresponding to each region, and compare its truncated postcode with the list of the postcodes.

Instead, in a profile generation step S1, profile data items are generated from the profile database 13 for use in one or more specific campaigns. For example, a campaign may include different media items for viewers in the North and South of England, so a campaign-specific profile data item may indicate whether a given subscriber is located in the North or South of England. The profile management function 11 interrogates the profile database 13 and determines a campaign-specific profile datum for each subscriber ID intended to receive the corresponding campaign. In this way, the profile data items stored on the profile database 13 may be used flexibly to define the segments for a specific campaign, without requiring a large quantity of profile data to be broadcast to or stored at the receiver 1.

The profile data may comprise a discrete set of profile data for each campaign, and/or general profile data that is not specific to a particular campaign. For example, the general profile data may comprise data likely to be of general use in defining segments, such as gender, age range, location, socio-economic group etc. This general profile data need only be updated occasionally, while campaign-specific data should be updated as new campaigns are introduced.

Also in the profile generation step S1, campaign metadata are compiled, comprising:

For each campaign, a campaign ID and a list of segments

For each segment, a segmentation rule and a media item identifier

For each copy identifier, location information indicating where in the broadcast stream the media item is located In steps S2 and S3, the updated profile data items and the campaign metadata are acquired by the receivers 1 in advance of the substitutional slots to which the campaign metadata relate. Note that the order in which steps S2 and S3 are performed is not important. The updated profile data and campaign metadata may be transmitted periodically on one or more channels separate from programming channels and hidden from users of the receiver 1, and to which each receiver 1 may tune periodically, such as once a week. The profile data items may be portioned into blocks according to subscriber ID, so that the receiver 1 need only receive the block relevant to its subscriber ID, thus reducing the time for which the receiver 1 need be tuned to the hidden channel.

At step S2, each receiver 1 acquires its corresponding updated profile data items and updates its locally stored profile data accordingly. The campaign specific profile data may be broadcast in encrypted form such that only the receiver 1 having the associated subscriber ID may decode the corresponding campaign-specific profile data item(s), for example using a key stored on the smart card.

Figure 3:
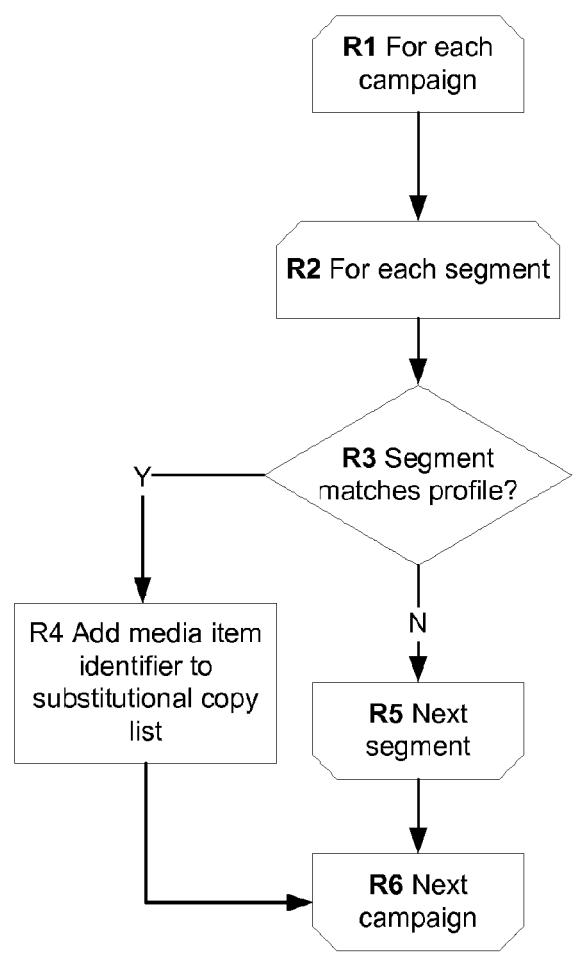
FIG. 3 is a flowchart of steps performed by the receiver in determining which media items to acquire.

At step S3, each receiver 1 acquires and stores the campaign metadata, and builds a substitutional copy list for itself by the following process, as shown in FIG. 3. For each campaign (step R1), the receiver 1 considers each segment in turn (R2), parses the associated segmentation rule, and attempts to match the segmentation rule with its stored profile data (R3). If a match is found, then the media item identifier for that segment is recorded in the substitutional copy list (R4) and the receiver 1 moves to the next campaign (R6); otherwise, the receiver 1 considers the next segment (R5). Since the receiver 1 can only output one substitutional media item at most per substitutional slot, it is not necessary to consider other segments in a campaign once a match is found.

The segmentation rule and profile data may be defined in many different ways. In one embodiment, campaign-specific profile data may simply indicate into which segment the associated receiver 1 has been categorised. The segmentation rule then merely requires the receiver 1 to match its previously indicated segment with one of the segments in the campaign metadata. In another embodiment, each segmentation rule may be expressed as a combination of different profile data items, which may not be campaign-specific, for example:

IF (GENDER=Male) and (REGION=Borders or Scotland) then SEGMENT=1
IF (GENDER=Female) and (REGION=Borders or Scotland) then SEGMENT=2 and so on.

Alternatively, the profile data could be dispensed with altogether and the campaign metadata could explicitly identify the receivers belonging to each segment. In that case, profiling is performed internally at the profile management function 11.

In a media content delivery step S4, each receiver 1 acquires the media items identified in the substitutional copy list. The media items may be stored in a partition of a local hard disc, for example. If an identified media item is already stored locally, it may be removed from the substitutional copy list and need not be acquired.

In an alternative embodiment, each receiver 1 may acquire and store all of the media items for a campaign, and may select one of the media items for output based on a later comparison of the associated profile data with the segment definitions for that campaign. This alternative is more wasteful of local storage, but allows the order of steps S2 and S3 to be reversed.

In a scheduling step S5, the scheduling function schedules the substitutional campaign into the broadcast schedule, as described in detail below. In outline, this step generates a substitutional schedule indicating which substitutional campaigns can be shown in which substitutional slots in a broadcast schedule. Each substitutional slot is defined by a splice point indicating the frame-specific timing of the start and/or end of the substitutional slot in a particular broadcast channel.

At this stage, automation events are booked into the broadcast schedule as metadata in the substitutional slot to enable the encoders of the programme broadcast function 10 to generate the splice point messages and perform any stream conditioning necessary to aid splicing at the receivers 1. Additional automation events may be booked into the broadcast schedule at or before the start of each programme break containing substitutional slots to allow the substitution options to be communicated to the receivers 1.

At a play out step S6, a booked automation event (or alternatively an event generated by the automation function generated using a substitutional slot look-ahead) causes the programme broadcast function 10 to broadcast, in a trigger track associated with a broadcast channel, a substitutional break schedule comprising a list of campaign IDs for each substitutional slot. The receivers 1 tuned to that channel receive and process the substitutional break schedule in order to determine for each substitutional slot whether a locally stored media item is available having the campaign ID indicated for a specific slot; if so, that locally stored media item is inserted in the slot in place of a linear media item included in the broadcast channel. Optionally, each media item may comprise a plurality of versions (e.g. standard or high definition) of the same content, and the receiver 1 may select one of the versions for output, for example based on an output mode (e.g. standard or high definition).

The selected media items are cued by the receiver 1 for output at the defined splice points of the associated slots in the broadcast channel. The automation function next generates a splice point trigger at the point indicated by the substitutional slot which is then relayed to the encoder and used to signal the receiver to condition the output stream for splicing. The splice points may be defined as splice events within the broadcast channel, using for example the SCTE 35 standard. When the receiver 1 receives the splice event, it outputs the locally stored media item selected for the corresponding slot, if available, in place of the live broadcast stream. At the end of the substitutional slot(s), indicated by the duration of the splice event or by a further splice event, the output of the receiver 1 reverts to the live broadcast stream.

In an update step S6, the receiver 1 may delete stored media items which are no longer required, for example which no longer match the stored profile data after the latter is updated, or for which the associated campaign has expired. The receiver 1 may also delete campaign-specific profile data items and/or campaign metadata associated with an expired campaign. Alternatively, previous versions of at least profile data and campaign metadata may be stored at the receiver 1 for reporting or diagnostic purposes.

The receiver 1 may update a counter associated with a specific campaign if a media item associated with that campaign has been output. The receiver may update a counter associated with respective individual media items, when that media item is output. The receiver 1 may transmit the viewing data 7 associated with a particular campaign to the profile management function 11, where the database 13 may be updated with the viewing data 7.

Campaign Attributes

In both substitutional and linear scheduling, a particular campaign may have some or all of the following attributes:
Demographic—The target audience of the campaign
Campaign Targets
  Centre break ratio—the proportion of advertising media items to be shown in a break within a broadcast programme, rather than between broadcast programmes
  Position in Break
  Top-tail—the number or proportion of slots at the start and end of a break (considered more desirable than the middle of the break)
  Target Ratings
  Strike weight—a measure of how the frequency of display of the campaign varies over time
Universe—the number of individuals in the demographic being targeted by the campaign
Clash Code—a category code used to implement restrictions imposed by regulators as to how advertisements may be placed together in a schedule (e.g. alcohol and car-related advertisements are not to be shown in the same break).
One or more reporting categories—code for the product type(s) being advertised; these may be used for reporting purposes, but may also impose restrictions on other advertisements shown in the same break: for example, copy items from different campaigns advertising the same product type may not be shown in the same break.

The programming schedule itself may include the following attributes:

Restriction codes (by time)—e.g. codes that indicate time restrictions for certain types of advertisement, such as a watershed.

Cast List—the list of cast members appearing in a broadcast programme.

In addition, an individual copy (i.e. media) item for a particular campaign has its own set of attributes or metadata:

Duration—i.e. the display length of the advertisement

Clock number—a unique identifier for the media item

Restriction codes—a media item for a campaign has a set of restriction codes, which may be defined only after the booking stage. The codes define properties of the content of the media item which may restrict the scheduling of the media item, such as the type of product or service being advertised, the minimum age of viewer or the watershed after which the media item may be shown.

Cast list—the list of cast members appearing in the media item. Regulations may stipulate that there should be no overlap between cast members in an advertisement break and cast members on the preceding and/or following programme, so that cast list attributes should be specified for each advertising media item.

Figure 4A:
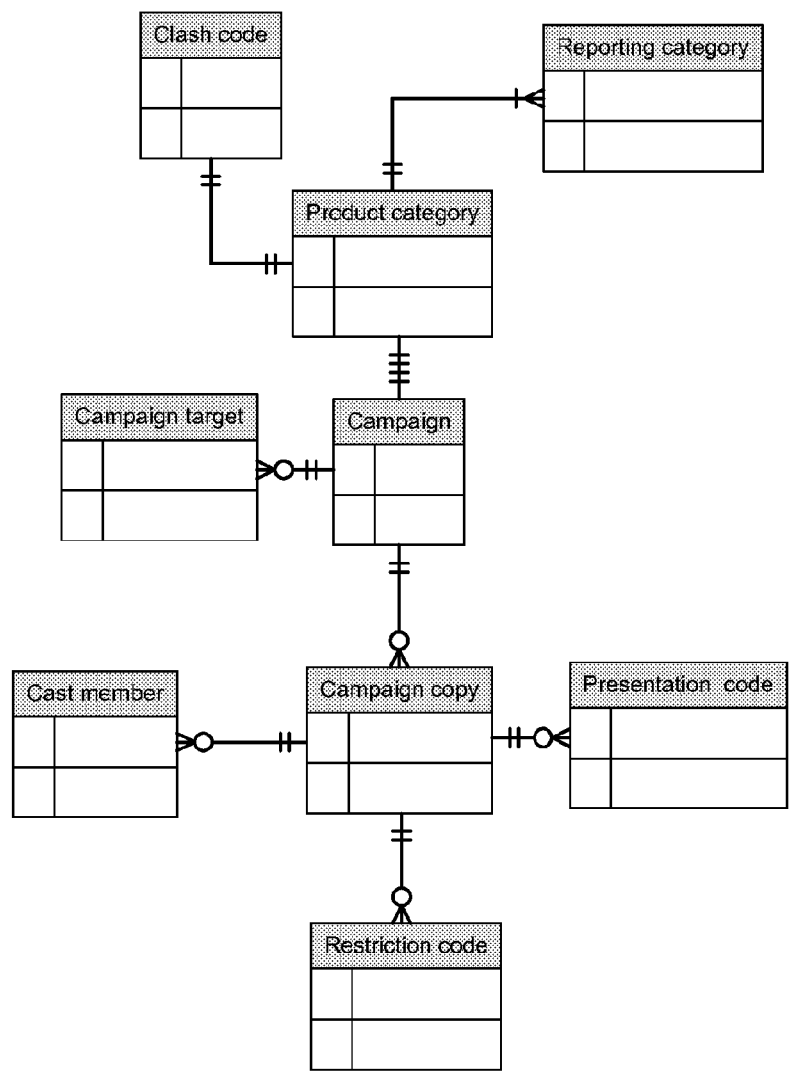
FIG. 4a is an entity relationship diagram for the attributes of a non-aggregated campaign.

FIG. 4a shows the main entity relationships between the attributes and the campaign and campaign copy (i.e. media items), in a non-aggregated campaign. The clash code has a one-to-one relationship with the campaign as a whole, while the campaign target and reporting category have many-to-one relationships with the campaign as a whole. The campaign may have a one-to-one relationship with a product category, through which the relationship with the clash code and reporting category is acquired. Individual copy items have a many-to-one relationship with the campaign as a whole; in other words, each campaign may have one or more associated copy items. Cast Members, Restriction Codes and Presentation Codes each have a many-to-one relationship with an individual copy item.

Hence, it can be seen that a campaign comprises a set of media items, with some attributes (campaign target, clash code, reporting category) associated with the set as a whole, while other attributes (cast member, restriction code, presentation code) are associated with individual media items (or subsets of media items) within the set.

Substitutional Variants

Different substitutional variants may be used, based on the number of campaigns and copy variants of those campaigns scheduled in a slot in a programme schedule. Each slot contains a linear media item that is included within the broadcast channel, for output by receivers for which substitution is not enabled, or for which the profile data is not addressed by any of the segments.

Figure 5:
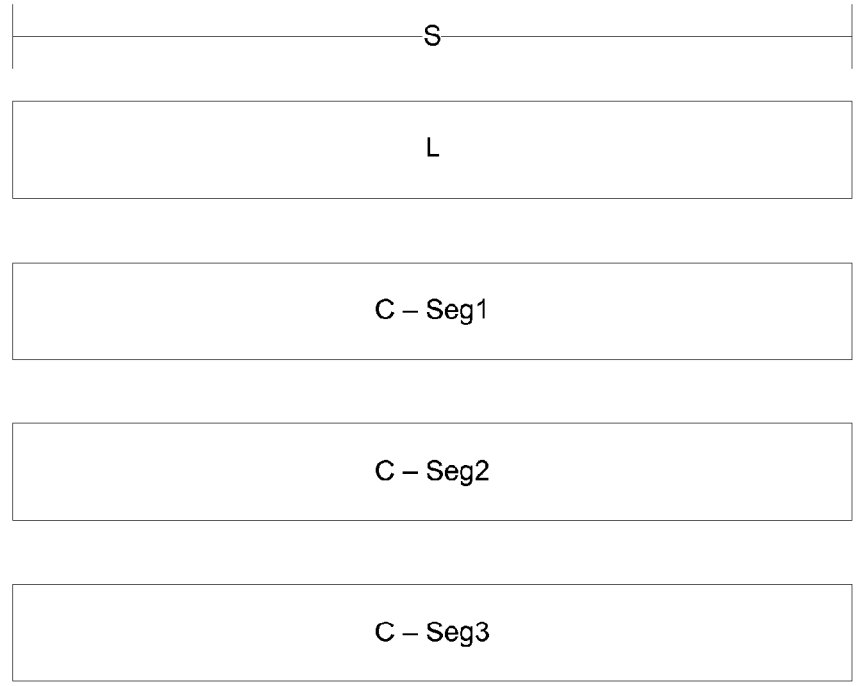
FIG. 5 is a diagram of a substitutional slot containing a single advertiser multiple copy campaign, in an embodiment of the invention.

FIG. 5 shows a first variant, referred to as Single Advertiser Multiple Copy (SAMC), in which the slot S is scheduled to contain a linear media item L and multiple substitutional media items from a single campaign C. The segment data Seg1, Seg2, Seg3 for each substitutional media item defines the segment addressed by that item.

Figure 6:
FIG. 6 is a diagram of a substitutional slot containing three multiple advertiser single copy campaigns, in an embodiment of the invention.

FIG. 6 shows a second variant, referred to as Multiple Advertiser Single Copy (MASC), in which the slot S is scheduled to contain a linear media item L and multiple substitutional media items, each media item being from a different campaign C1, C2, C3. The segment data SegA, SegB, SegC for each media item defines a segment addressed by that item, but the segments from different campaigns may be defined in terms of different profile data items or segment rules; this raises the possibility that the segments may overlap, so that some receivers cannot determine which copy to output, based on a comparison with their profile data.

In a further variant, referred to as Multiple Advertiser Multiple Copy (MAMC), the slot is scheduled to contain substitutional copy from multiple campaigns, with more than one of the media items belonging to the same campaign, and addressed to different segments. Hence, MAMC is a hybrid between SAMC and MASC.

Scheduling

Scheduling may need to be performed in two stages:

1. Booking—placement of campaigns within a broadcast schedule that is known in advance. Booking may be performed sequentially, as campaigns are made available for scheduling.

2. Pre-transmission checking—checking immediately before broadcast that the scheduled campaign media items meet the required constraints with reference to the final version of the schedule immediately prior to transmission. Pre-transmission checking may be necessary as an additional step to booking, because the broadcast programmes may have changed from the advance broadcast schedule. For example, the broadcast timing may have changed due to overruns or newsflashes, or the programme content may have changed, or may be known to include material such as news items that may clash with particular content in a media item.

The scheduling of advertisement campaigns, based on the attributes or metadata listed above, is a combination of two formal classes of mathematical and computational problem, namely constraint satisfaction and optimization. Booking involves constraint satisfaction based on attributes of the schedule and of campaigns within a break, and optimization based on the campaign targets of the different campaigns. Pre-transmission checking involves constraint satisfaction based on attributes of the programming schedule and the media items booked within a specific break.

Examples of these constraints include:

Booking Constraints

The duration of the slot within the break should meet or exceed the duration of the media item The clash codes for the campaign should not clash with the time-based restriction codes for the schedule The clash codes for the campaign should not clash with other clash codes for other campaigns contained within the break Booking Optimisations The booking of a slot should make efficient use of the demographic inventory within the schedule; in other words, the predicted demographic profile of viewers of a slot within the schedule should match as closely as possible target demographic of campaigns booked with that slot.

The booking of the slot should contribute to campaign targets such as ratings and campaign delivery ratios (centre-end break, position in break, strike weight etc.)

Pre-Transmission Checking Constraints

The media item should not contain any cast members in common with adjacent (preceding or following) programmes The restriction codes applied to the media item should be compatible with the contents of the programming, the break, and the time of day In linear scheduling, the above constraint satisfaction and optimization problems require substantial computational resources, particularly in the case where time-critical rescheduling is needed during the pre-transmission check.

Substitutional advertising introduces multiple alternative media items, potentially from multiple different campaigns, within the same substitutional slot within a break. Substitutional advertising gives rise to additional complications, as follows:

Additional Booking Constraints

The duration of the slot within the break should meet or exceed the duration of each media item scheduled to that slot.

The durations of the substitutional media items within a slot should all be the same (or at least add up to the same duration; for example, two or more shorter media items may be booked sequentially within a slot provided that the total duration of the sequential media items is equal to the duration of the slot.

Clash code checks against the schedule should be applied across all the substitutional variants of the substitutional slot.

Clash code checks between media items within the break should be applied across all the substitutional variants of the substitutional slots. This can potentially include all the variants of additional substitutional slots within the break.

Additional Booking Optimisations

The bookings of all the substitutional media items within a substitutional slot should make efficient use of the demographic inventory within the schedule.

The booking of all the substitutional media items within a substitutional slot should contribute to their respective campaign targets such as ratings and campaign delivery ratios (centre-end break, position in break, strike weight etc).

Additional Pre-Transmission Constraints

No substitutional media items may have cast members in common with the preceding programming.

The restriction codes applied to all of the substitutional variants should be compatible with the contents of the programming, the break, and the time of day, taking into consideration that there may be more than one substitutional slot within a break.

These additional requirements have the effect of increasing significantly the number of calculations that need to be performed to ensure that the scheduled contents of a break are compliant with the relevant constraints and optimisations. These calculations need to be performed every time a booking is performed, and also as part of pre-transmission checking Consider an example of a break containing 5 slots, two of which are substitutional slots. The first substitutional slot contains a SAMC campaign with 3 substitutional options. The second substitutional slot contains three MASC campaigns along with the linear campaign. This gives the following break makeup:

5 slots in the break 8 campaigns in the break 11 media items in the break 20 copy variants of the break During booking, only campaign compliance is considered, which gives rise to a processing uplift of ⅝ or 60%. During pre-transmission checking, copy compliance should also be performed. If compliance is performed as if all the media items are shown together, this gives rise to a processing uplift of 11/5ths or 120%. However this simplification introduces the limitation that campaigns with the same clash code cannot share the same substitutional slot even thought the effect the clash codes are meant to prevent (e.g. two campaigns with the same clash code being shown in the same break) could never occur. A more correct approach would be to consider all the copy variants in turn which, even without optimization, would increase processing by 20 times in the above example.

Aggregation

Figure 4B:
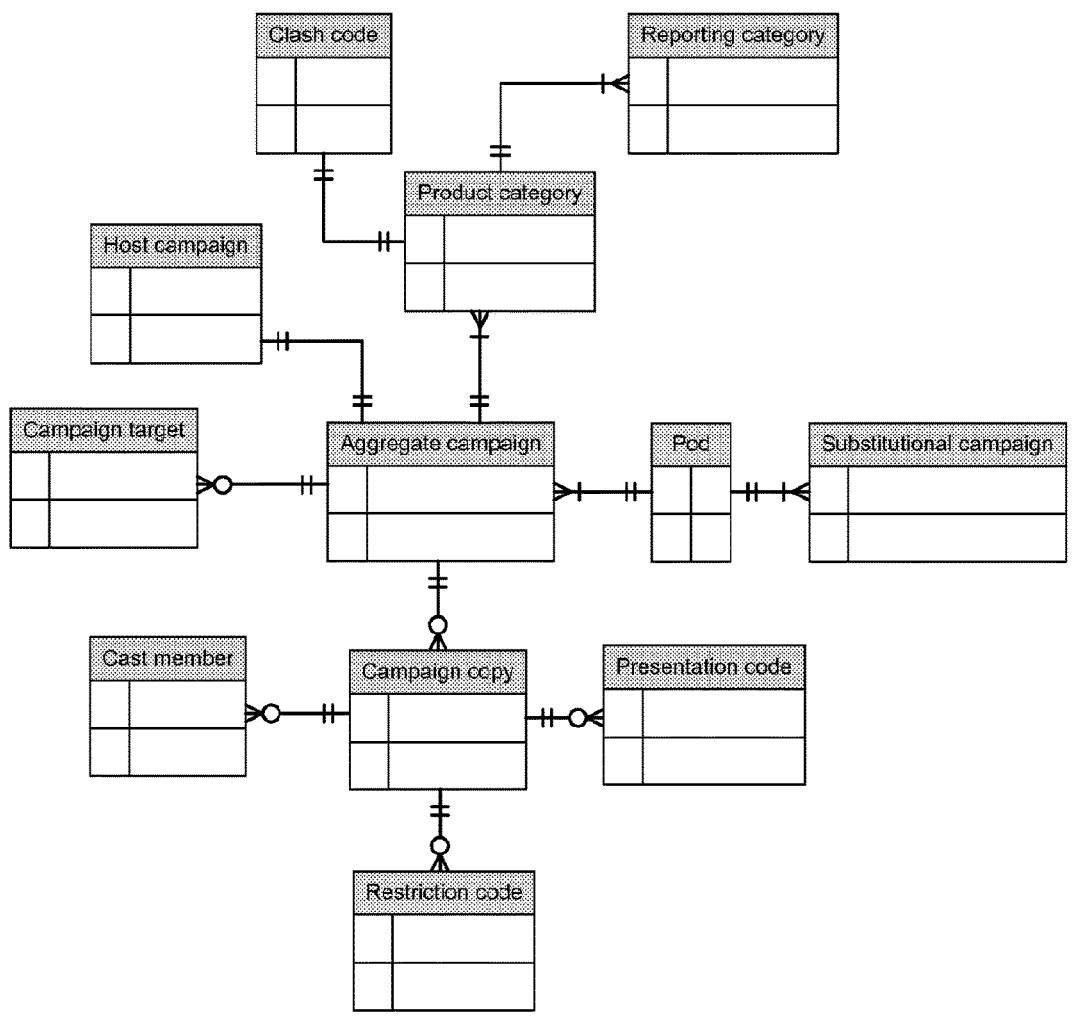
FIG. 4b is an entity relationship diagram for the attributes of an aggregated substitutional campaign.

In a first embodiment of the invention, at least some of the above problems are overcome by a process in which the complexity of the substitutional model is reduced substantially to that of the conventional linear model. The present inventors have observed that the attributes belonging to a single campaign and its associated copy items, and the relationships this campaign and copy items have with programming and other copy items within a break are broadly similar regardless of whether a single campaign/copy item combination or an aggregate of many campaigns and many copy items are considered. Referring to the entity-relationship diagram of FIG. 4b, if the Campaign entity is replaced with an Aggregate campaign and the Campaign copy item with multiple Campaign copy items, then the only change that would need to occur is that the relationship between Campaigns and Clash code would change from "one to one" to "one to many". All other relationships would remain the same. This shows that an aggregation scheme may allow substitutional advertising to be scheduled in a similar manner to standard linear advertising.

In an aggregation scheme, multiple substitutional media items are treated as a single aggregate for the purposes of booking into a linear schedule. In other words, attributes that are specific to individual media items, or to a subset of the media items, are aggregated together and the aggregated attributes are treated as having a many-to-one relationship with a single aggregated Campaigns entity, referred to as an aggregate campaign. The aggregate campaign is then booked into the schedule by applying the constraints and/or optimisations to the aggregated attributes.

Figure 7:
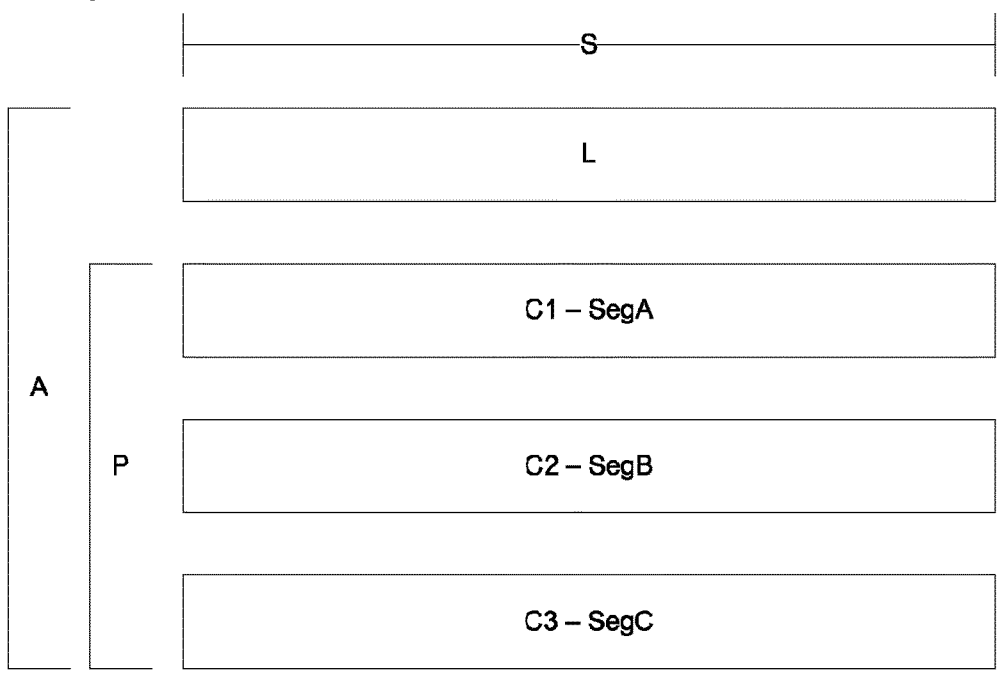
FIG. 7 is a diagram illustrating the scheduling of an aggregate substitutional campaign into a slot, in an embodiment of the invention.

The aggregation scheme will now be explained in more detail, with reference to FIG. 7. An aggregate campaign A is composed of a single linear media item L and a single "pod" P which in turn contains one or more substitutional media items belonging to different campaigns C1, C2, C3. The media items are selected so that the user segments SegA, SegB, SegC of media items within a pod do not overlap; this means that a given specific user profile will fall within one segment, at most.

Attributes of the constituent media items of the aggregate campaign A (including booking constraints and campaign targets) are aggregated together and the aggregate campaign is scheduled using the aggregate set of attributes as if they were a single set of attributes for a single campaign. In a similar manner, an aggregate campaign A comprises individual media items for each of the campaigns in the aggregate. The schedule includes a set of aggregate slots, into which aggregate campaigns may be scheduled.

Pods P are formed by grouping compatible substitutional campaigns C1, C2, C3 together. Substitutional campaign compatibility is assessed according to the following factors:

Campaign segment overlap

Target demographic

Campaign duration

Media item length

Each pod P is assigned a unique identifier. Note that the same substitutional campaign can be associated with more than one pod P.

Each pod P is grouped with a linear campaign L to form an aggregate campaign A. Each aggregate campaign A is also assigned a unique identifier. Note that the same pod P may be grouped with more than one linear campaign L, to form a corresponding plurality of aggregate campaigns A.

Campaign targets of the constituent items of the aggregate campaign may be aggregated into a single set of campaign targets which become the campaign targets of that aggregate campaign A. Alternatively, campaigns may be selected for inclusion together in a pod P on the basis of compatible campaign targets.

Aggregating attributes may give rise to a constraint being applied unnecessarily, such that the aggregate campaigns cannot be scheduled in a break. For example:
  Aggregate campaign A1 is booked first into a slot in a break, and has a car clash code;
  Aggregate campaign A2 also contains a car clash code and is required to be booked into another slot in the same break.

Based on this information alone, campaign A2 cannot be booked into the break, because a booking constraint prevents two media items having the same clash code being shown in the same break. However, additional information is available about the decomposition of the aggregate campaigns in question:
  Campaign A1 selects a campaign C1 for a car from a first manufacturer if the subscriber is in the London region
  Campaign A2 select a campaign C2 for a car from a second manufacturer if the subscriber is in the Border region Hence, if the segments of campaigns A1 and A2 are taken into account, it is apparent that campaign A1 and campaign A2 cannot both select a car advertisement for a given subscriber, since the segments of the two car campaigns do not overlap: a subscriber cannot be both in London and the Border region.

As a solution to this problem, in the case of a clash rule being invoked between two aggregate campaigns, the aggregation function may communicate to the scheduling function whether the clash is reconcilable e.g. because the segments between the two campaigns do not overlap where there is a clash rule invoked. This communication may either occur in real-time or the booking could be allowed and marked as having a warning status and an asynchronous process may query the aggregation function for all bookings with a warning status and prevent booking where the aggregation function indicates that the clash is irreconcilable.

The use of aggregate campaigns, each having the aggregated attributes of the multiple substitutional campaigns contained therein, addresses the additional booking and pre-transmission checking constraints of a substitutional system, without requiring significant changes to a linear scheduling system, and with only a modest increase in processing complexity. This holds true regardless of the number of segments and substitutional options contained within a pod P.

Separate Booking

In a second embodiment, one or more linear media items may be booked into an available slot separately from the substitutional media items, and preferably before any substitutional media items are booked into that slot. The booking of linear media items may be performed using conventional booking techniques. However, it is then preferable to indicate for each slot what kind of substitutional media items can be booked into that slot; this indication comprises so-called 'avail schedule' data which is generated and may be updated during booking The avail schedule data may be based on one or more predetermined substitutional rules of the host campaign, to which the linear media item belongs. For example, if the host campaign targets "adults" then allow substitutional avails to top-slice high income households)

The avail schedule data may indicate constraints on substitutional media items that can be booked into the break as a whole, such as:
  clash codes relating to programmes before and/or after the break
  clash codes or adjacency rules relating to media items booked into other slots within the break (e.g. if a car advertisement is already booked into the break, do not book an alcohol advertisement into an avail)
  compliance codes relating to watershed and HFSS (high fat sugar and salt) exclusions The avail schedule data may also indicate constraints on substitutional media items that can be booked into a specific slot within the break, such as:
  slot length, determined by length of linear media item booked into that slot
  single/multiple advertiser: indicates whether the substitutional media items may be from a different advertiser from that of the linear media item
  segment exclusions: defines which segments are not available for substitutional advertising, for example because they have already been allocated within that slot.

The substitutional media items for each slot may be booked as an aggregate pod P as in the first embodiment. Alternatively, the substitutional media items may be booked individually, in which case the segment exclusions for that slot are updated as the bookings are made.

Overlapping segments between the different media items booked into each slot are resolved according to a predetermined rule, so that the segments no longer overlap. For example, priority may be given in order of booking; hence, in the example above, the segment of the first substitutional media item is (ABC1 NOT London). If a second substitutional media item, booked subsequently, is targeted at households with children, the actual segment for that item is (children NOT ABC1 NOT London).

In an alternative rule, although the linear media item is booked first, it is given lower priority than any substitutional media items booked subsequently, and the substitutional media items are given priority in order of booking. In that case, the segments would be:
  Linear item: London not ABC1 not children
  $1^{st}$ substitutional item: ABC1
  $2^{nd}$ substitutional item: children not ABC1

Other segment priority rules may be used within the scope of the invention. For example, subsequent bookings within a slot may be prevented if the associated segment overlaps with any of the segments already booked into that slot. However, such a rule would require standardization of segment definitions so that overlap can be automatically determined, which reduces the flexibility of the booking system.

An advantage of the second embodiment is that bookings can be confirmed as they are requested, rather than requiring booking requests to be held until aggregate booking can be performed, as in the first embodiment.

In a development of the second embodiment, the avail schedule data for a specific slot may include one or more clash codes relating to media items already booked in other slots within the same break. For example, if an alcohol-related media item has been booked into another slot within the break, such as a linear or substitutional slot, an 'alcohol' clash code may be included in the avail schedule for the specific slot. A predetermined clash code rule then prevents a media item with a 'car' clash code from being booked into the specific slot, to prevent the possibility of car and alcohol-related media items being shown in the same slot.

Fractional Slot Durations

The scheduling of fractional media items having a duration that is a fraction (such as one half) of that of a substitutional slot creates additional constraints in that one fractional media item should be matched with one or more other fractional media items and scheduled sequentially so as to make up the duration of one substitutional slot. In one solution, fractional media items are concatenated together to form a concatenated media item having the aggregated attributes of the constituent media items, and the concatenated media item is then treated as a single media item with the aggregated attributes for the purpose of scheduling.

In another solution, the fractional media items are scheduled into an aggregate campaign, and the substitutional schedule broadcast to the receiver indicates that the fractional media items are to shown sequentially rather than as alternatives. For example, the schedule may indicate the following substitutional options:

1. substitutional campaign 12345
2. substitutional campaigns 1111 and 2222 in sequence In this solution, concatenation of the fractional media items need not be performed prior to scheduling, but the need to schedule fractional media items in sequence creates additional constraints that should be resolved by the booking system.

Disabling Substitutional Options

In the embodiment described above, it is assumed that once a campaign or aggregate campaign is scheduled to a slot, any of the substitutional options may be selected by one or more receivers, since the scheduling constraints have been satisfied. In an alternative embodiment, one or more substitutional options with a campaign or aggregate campaign may be selectively disabled at or just before the time of broadcast, for example by means of modification of the substitutional schedule. This selective disablement may be used to control the frequency with which each substitutional option is displayed. The substitutional options to be disabled may be varied during a campaign, so that the delivery of certain substitutional options may be balanced with the need for rescheduling.

This technique could be applied to a linear scheduling scheme, in which a scheduled campaign defines an inventory of possible media items for a slot, and the linear item for that slot is selected from the inventory of possible items.

Variable Substitutional Options

If the same substitutional campaign (including an aggregate campaign) is scheduled in multiple substitutional slots, with the same associated campaign metadata and profile data, a specific receiver 1 will deterministically select the same substitutional option each time the campaign is scheduled. In some cases, it may be desirable to vary the substitutional option for a specific receiver each time a campaign is scheduled.

In one embodiment, each media item may comprise a sequence of clips, with one clip of the sequence being selected in turn for output by the receiver every time the associated media item is selected for output. This embodiment is particularly advantageous for delivery of media items having a total length that is greater than that of a substitutional slot, and enables delivery of a series without the need to schedule each clip of the series in a different, sequential campaign.

Prioritization

One of the problems mentioned above is to control the delivery of substitutional media items so as to optimize the probability of a particular media item, addressed to a selected audience segment, being output by the receivers 1 falling within that audience segment. This problem cannot be solved by scheduling alone, because predicted audience profiles cannot be determined for the variety of segments that might be addressed by the substitutional media items.

The problem can be illustrated by a practical example: the 'Doctor Who' series provided by the BBC is predominantly watched by children, or at least households including children. However, there are a number of smaller segments that also watch the series, such as students, science fiction fans and so on. Advertisements suitable for children are unlikely to appeal to these smaller segments, and vice versa. Also, these smaller segments overlap to some extent, so optimal targeting cannot be achieved merely by defining respective substitutional options for students, science fiction fans and so on. However, a particular advertiser may wish to target one of these smaller segments, and may have identified the 'Doctor Who' series as a suitable means for reaching this segment.

Moreover, the probability of a media item reaching its targeted segment is not necessarily proportional to the number of placements of that media item within a schedule, because of the size of each segment. For example, a media item targeted at a locality containing only 1000 homes is only ever likely to be selected by a subset of the 1000 homes regardless of the number of placements, whereas a media item targeted at men in the South East of England may result in hundreds of thousands of selections, even if only placed in a few slots in a schedule.

One solution would be to push the substitutional decision-making process almost entirely to the receiver but, as identified above, this requires too much data storage and processing power in the receiver.

In the present embodiment, rather than using a deterministic substitutional process as described above, priority ratings relating to the substitutional media items are transmitted to the receivers, and the selection of substitutional media items by the receivers are based on the priority ratings. The priority ratings may include global priority ratings and/or priority ratings that are specific to receivers or groups of receivers. The priority ratings may vary over time.

Since the substitutional system is not deterministic in this embodiment, the different substitutional media items assigned to a particular slot may have overlapping segments. Hence, substitutional media items are booked into slots subject only to the booking and pre-transmission constraints described above. This increases the probability that a receiver falling within a segment of a media item may select that item.

A ratings system, external of the scheduling function 8, gathers information from receivers 1 and/or other sources to allow ratings for substitutional media items to be determined. Global priority ratings are then calculated for each media item or set of media items, based on the associated segments. These global priority ratings are broadcast on a daily basis to all receivers 1, which store the priority ratings for the associated locally stored substitutional media items.

A system external to the scheduling function 8 determines the degree of matching between a predicted audience profile for a slot, and the segments of the substitutional media items booked into that slot. This degree of matching may be used to calculate a specific priority rating for each of the substitutional media items, although other criteria may be used. The specific priority ratings are broadcast to the receivers 1 in the substitutional schedule data, broadcast shortly before the broadcast time of the slot. The specific priority ratings may be implicit, for example by broadcasting a specific rating value associated with each substitutional media item, or implicit, for example from the order in which the substitutional media items are indicated for a particular slot in the substitutional schedule data.

When the receiver 1 receives the substitutional schedule data, it selects a substitutional item for output, based on a comparison between the segment of the receiver 1 and the segments indicated for the substitutional media items, as described above. However, in this embodiment there may be more than one substitutional media items that match the segment of the receiver 1, in which case one of these is selected for output based on their specific and/or global priority ratings. The media item having the higher priority rating may be selected, or a random (or pseudo-random) selection may be made of the matching media items, weighted according to the priority ratings. Some of the weightings may be zero, so for example media items having a low priority may never be selected. The zero weighting may be based on one of the priority ratings, such as the specific priority rating, with the remaining media items being weighted according the global priority ratings.

A priority rating threshold may be predefined, either globally or on a per-campaign basis, so that priority ratings falling below the threshold are allocated zero weighting by the receiver 1 or are otherwise prevented from being selected for output. If none of the possible substitutional media items for a slot have a priority rating above the threshold, the threshold may be adjusted downwards so that one of the possible media items can be selected.

In this embodiment, the receiver 1 may alternatively or additionally select a substitutional media item for output on the basis of a local priority rating, based on historical or other criteria specific to the receiver 1. For example, a predetermined maximum value may be set on the number of times each media item is output by the receiver 1, such that the receiver 1 will no longer select that media item for output once the maximum has been reached, but may instead select another media item, possibly having a lower priority rating. As another example, a minimum interval between successive selections of the same media item may be set, such that the receiver 1 is prevented from re-selecting a media item when less than the minimum interval has elapsed. As another example, a start date constraint may be set such that a media item cannot be selected for output before a specified start date.

More generally, the local priority rating of a substitutional media item may be a function of the global priority rating, the time left until the end of the campaign, and/or the difference between the number of times the item has already been output and the predetermined maximum number of times that item may be output. For example, the local priority may increase as the time left to the end of the campaign reduces. The local priority may decrease as the number of times the media item has been output approaches the predetermined maximum.

The above criteria may be set locally at the receiver 1, or may be communicated to the receiver 1. The criteria may be specific to particular media items or sets of media items. In this way, the delivery of the media items can be controlled so as to optimize their exposure to the target segment.

Linear Media Item Segment

In at least some of the embodiments described herein, it is assumed that the receiver will always perform media substitution, if a suitable substitutional media item is available, rather than output the linear media item for a slot. In these embodiments, the linear media item is selected as a default output. A disadvantage of this approach is that the target audience of the linear item may not match the profile of a specific receiver.

In an alternative embodiment, a segment is defined for each linear media item, and is communicated to the receivers so that the receivers can select to output the linear media item if the associated segment matches the stored receiver profile. Otherwise, the receiver 1 may output an available substitutional item.

The segment of the linear item may be defined by creating a campaign ID for the linear item, broadcasting the segment definition of that campaign at the campaign metadata delivery stage S3, and indicating the campaign ID for the linear item in the break schedule at step S6. The receiver then selects the linear item for output if the associated segment matches the receiver profile. The linear item may be selected in preference to any substitutional media item. Alternatively, a specific priority rating may be defined for the linear item as well as for the substitutional media items, as described above, and a selection may be made between the linear item and one or more available substitutional media items based on their relative priority ratings. If required, the linear item may have a maximum priority rating.

Alternatively, the segment for the linear item may be signalled just before the associated break, for example in the trigger track together with the break schedule. The receiver 1 then determines whether its profile falls within this segment and if so, does not perform substitution but outputs the linear item in its associated slot.

The segment for the linear item may be defined in terms of any of the profile data stored at the receivers 1, including general profile data or campaign specific data, as described above. The campaign-specific data may or may not be specific to any campaign ID created for the linear item.

Constraint Satisfaction at Receiver

In the previous embodiments, constraint satisfaction is performed entirely by the central scheduling function 8. One problem with this approach is that the selection of substitutional media items between different slots may be over-constrained, since it is assumed that any of the substitutional media items scheduled for a specific slot may actually have been output by a receiver in that slot. For example, one of the substitutional media items scheduled in a slot may be alcohol-related; this would prevent a car-related substitutional media item being scheduled in another slot in the same programme break. As a result, too few substitutional options may be available, and media items having certain clash codes or adjacency rules may be difficult to schedule.

Figure 8:
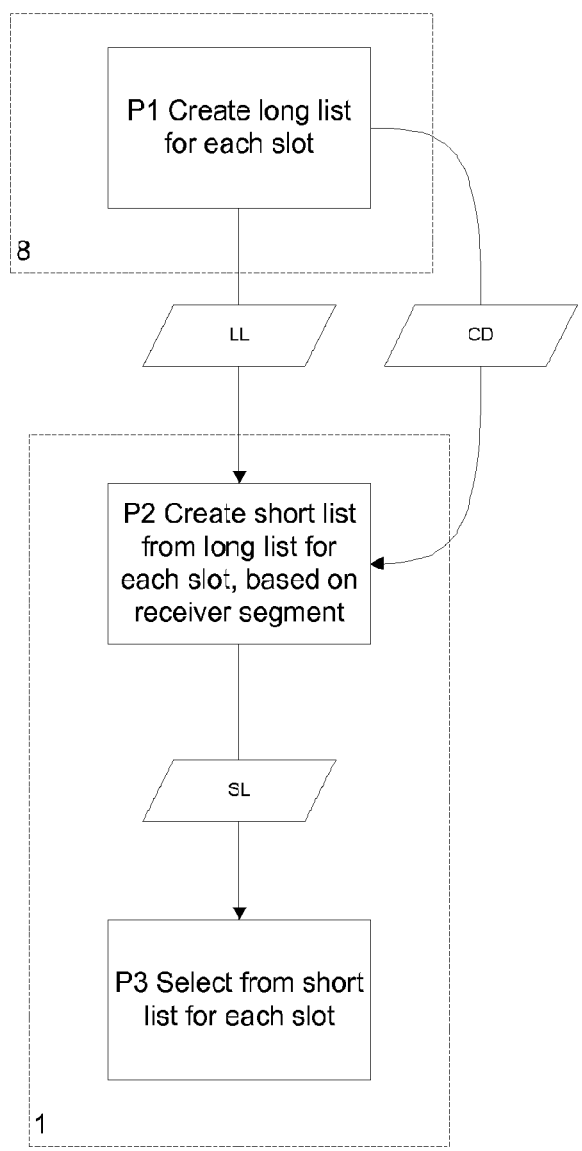
FIG. 8 is a diagram of an embodiment in which constraint satisfaction is partially performed at the receiver.

In the present embodiment, constraint satisfaction is divided between the central scheduling function 8 and the receivers 1, as shown in FIG. 8. The scheduling function 8 performs constraint satisfaction (step P1) for constraints that apply to all receivers 1, such as slot length, compliance codes (e.g. watershed, HFSS) and restriction codes relating to adjacent programming, while the receivers 1 each perform constraint satisfaction for constraints that are specific to the receiver, such as clash codes between substitutional media items within the same programme break.

The result of the constraint satisfaction by the scheduling function 8 for each slot is a 'long list' LL identifying all possible substitutional media items that can be output in that slot. The respective 'long list' LL for each slot in a break is broadcast to the receivers 1 in the substitutional schedule data immediately before the associated programme break. Constraint data CD, such as clash codes for each media item, are also broadcast to the receivers 1, for example as metadata received with the corresponding media items.

As in the previous embodiments, each receiver 1 records in advance the substitutional media item or items which match the profile segment of the receiver 1 for each campaign. When the receiver 1 receives the 'long list' LL for each slot, it determines (step P2) which of the indicated media items is available from local storage; these items will be available because they match the profile segment of the receiver 1, and the receiver 1 has been able to receive and record them. The available media items from the 'long list' LL comprise a 'short list' SL from which the receiver 1 selects (step P3) up to one media item for output in each slot. If none of the indicated media items is available for a particular slot, then the receiver 1 outputs the linear (i.e. currently broadcast) media content for that slot.

For each slot having a 'short list' SL, the receiver 1 selects one media item for output in that slot based, at least in part, on satisfying clash code constraints with the media items selected for output in any other slot within the same break and/or with any linear content item to be output in any slot within the break. These clash code constraints are satisfied locally at the receiver 1, so that constraints are only resolved between the media items actually selected for output at the receiver 1, and over-constraint between potential clashes is avoided.

In one variant, the receiver 1 satisfies the clash code constraints by selecting the media item to be output in each slot in turn, and satisfying the clash code constraints for each subsequent slot on the basis of the selection made for the previous slot or slots. The clash code constraints may therefore comprise filters on the clash codes of the media items that can be selected, based on the clash codes of the items previously selected. These filters are relatively simple to implement on the receiver 1.

Alternatively, the receiver 1 may satisfy the clash code constraints by considering some or all possible combinations of selections from the shortlists SL of each substitutional slot within the programme break, and excluding possible combinations where the clash code constraints between the selections for different slots are not satisfied. The number of possible combinations is likely to be low, since there may only be 2 or 3 substitutional slots in a break, and only a few media items in each associated shortlist, so that the clash code constraints may still be satisfied without too much complexity at the receiver 1.

Clashes with any linear media items may need also to be considered, unless the 'long lists' are selected by the scheduling function 8 such that there are no potential clashes with any of the linear media items within other slots within the break.

Where more than one item is available for selection from a short list even after satisfying clash code constraints, or more than one possible combination is available, the receiver 1 may select one of the items based on prioritisation, as described above.

Figure 9:
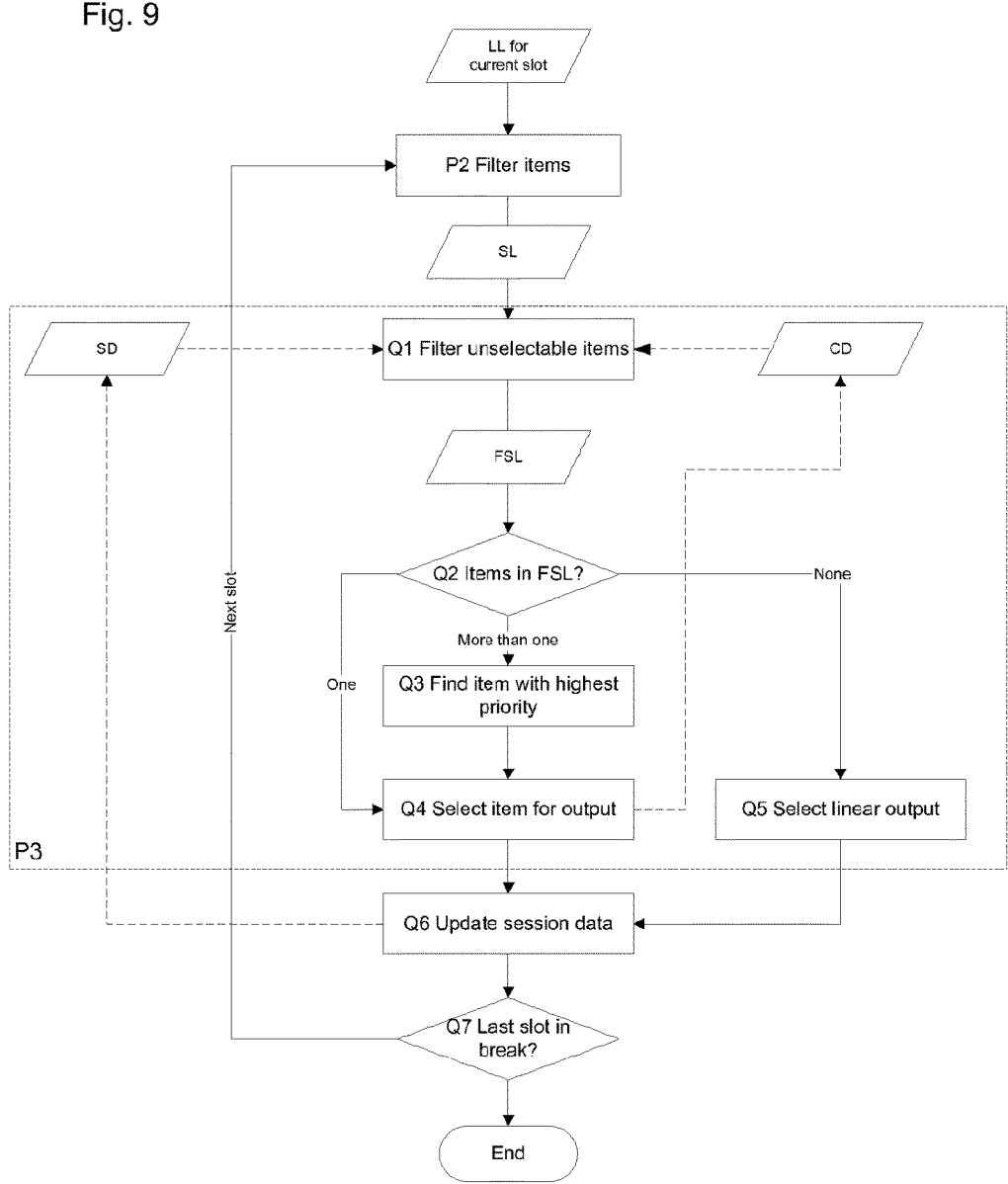
FIG. 9 is a flowchart of a process performed at the receiver, in the embodiment of FIG. 8.

A specific embodiment in which constraint satisfaction and prioritisation are combined in the receiver 1 is shown in FIG. 9. In this specific embodiment, each substitutional slot in a programme break is considered in sequential order.

For each substitutional slot in a break, the receiver 1 obtains the long list LL and filters out invalid or unavailable items at step P2 to obtain a short list SL. Within the selection step P3, the receiver 1 first filters the short list SL (step Q1) by removing those media items that do not satisfy clash code constraints with media items already output in the current break, as recorded by break session data SD. The session data SD may comprise the clash codes of the media items already output in the break. The receiver 1 may also remove those media items that have already been output by the receiver a predetermined number of times and/or more recently than a predetermined interval, as determined from campaign data CD. The result is a filtered short list FSL.

At step Q2, the receiver 1 determines how many media items remain in the filtered shortlist FSL. If more than one, the receiver 1 selects the media item having the highest priority (step Q3), which may be determined by a global, specific and/or local priority rating as described above, which is then selected for output (step Q4). If there is only one media item in the filtered shortlist FSL, that item is selected for output (step Q4). In either case, the campaign data CD is updated to record the output of the selected media item, and preferably the time of output so that the interval since the last output can be calculated. If there are no media items in the filtered short list FSL, the linear content is selected for output (step Q5).

Once a linear or substitutional media item has been output, the break session data is updated (step Q6) to record any clash codes associated with the output item. If the last substitutional slot has been processed (step Q7), then the process ends for the current break, but may be restarted for the next break. If not, the process repeats at step P2 for the next substitutional slot within the break.

Additional Media Items

In an additional or alternative embodiment, the receiver 1 may store additional substitutional media items that are not allocated to a particular campaign, but may be selected for output in slots where no campaign-related substitutional media items are available to the receiver 1. These additional media items may be unscheduled, in that they are not indicated in any substitutional schedule, or may be scheduled in specific slots.

The additional media items may be downloaded to the receiver 1 by including them in a substitutional copy list for the receiver 1, as described above. This may be achieved by creating a pseudo-campaign for the additional media items, with associated segments. In one specific example, the additional media items represent 'hyper-local' advertisements, for example relating to local businesses and services, and are divided into a large number of segments based on small geographic areas.

The receiver 1 may automatically select an additional media item for output in any slot for which no scheduled substitutional media item is available. Alternatively, the substitutional schedule may designate only certain slots as being available for additional media items, either exclusively or as an alternative to one or more campaigns designated in the same slot. In this alternative, the additional media items may be designated by a campaign ID corresponding to the associated pseudo-campaign.

The additional media items may be selected so as not to have clash codes that would conflict with other substitutional media items in the same break, so that constraint satisfaction need not be applied to the additional media items. Alternatively or additionally, the additional media items may be divided into multiple pseudo-campaigns each having different clash codes, and the substitutional schedule may designate one or more specific pseudo-campaign IDs in a slot, so that constraint satisfaction is performed by the scheduling function 8. The aggregation function described above may be used to group additional media items into multiple aggregate pseudo-campaigns, each of which is scheduled using the aggregate attributes of the additional media items contained within the aggregate campaign. This aggregation may be done automatically, by selecting additional media items for an aggregate pseudo-campaign based on similarity of attributes. The segments of the aggregate pseudo-campaigns may define respective non-overlapping geographical areas. For example, one aggregate pseudo-campaign may relate to local Indian restaurants, with each media item relating to an Indian restaurant in a different small geographical area.

Alternatively, the receiver 1 may perform constraint satisfaction of additional media items, by selecting for output an additional media item having a clash code or codes that do not conflict with other media items selected for output in the same break, for example as described above. The additional media items will generally have low priority, such that the receiver 1 only selects an additional media item for output after all scheduled substitutional media items have been selected in other slots within a break.

Recording & Playback

The above embodiments have been described mainly with reference to live viewing of broadcast programming, with insertion of substitutional media items into the displayed live broadcast stream. In one embodiment where the received broadcast stream is recorded locally by the receiver 1, such as a PVR, the inserted substitutional items may be recorded within the recording of the received broadcast stream, so that the displayed content on playback is identical to that seen when watching the live broadcast stream with any inserted substitutional media items. This embodiment is advantageous in that the user may see on playback exactly the same content as was seen when viewing the broadcast stream live. It should be noted, however, that the above embodiments do not require the broadcast stream to be viewed live; instead, the stream could be recorded for later viewing, with substitutional media items being inserted during recording, or linked to the recorded programme so that they are retrieved automatically and spliced in on playback.

In an alternative embodiment, the recording may include data identifying the splice points and substitutional schedule, and media substitution may be performed on playback, provided the necessary campaign metadata, profile data and substitutional items are still available at the receiver; these items may be saved for the duration that the associated recording is maintained at the receiver 1. This approach is more flexible, since any updates to the profile data, campaign metadata and/or substitutional items may be taken into account when selecting a substitutional item for playback. However, the user experience is different from conventional recording, in which the user expects to see on playback the same content that was previously viewed live.

In this alternative embodiment, a substitutional break during playback (a 'playback break') may be defined differently from a substitutional break in a live broadcast stream (a 'live break') For example, there may be fewer slots defined in the playback break than in the broadcast break. This is advantageous since, on playback, the user is able to skip the break altogether by fast-forwarding or jumping to the end of the break. By providing a shorter break on playback, there is less incentive for the user to skip the break. In one alternative, the user may be prevented from skipping the break by technical means, such as inhibiting fast forward or jumping, but this is not too onerous on the user as the playback break is relatively short.

A further advantage of having few slots in the playback break is that constraint satisfaction is simplified; in the extreme case of only one slot per playback break, constraint satisfaction between different slots in the break is avoided altogether. This is particularly advantageous in embodiments in which some or all of the constraint satisfaction takes place at the receiver.

The number of slots may be reduced in the playback break simply by removing or skipping one or more of the slots defined in the live break. The selection of which slots to remove may be made according to metadata included in the substitutional break schedule, for example. Alternatively, different slots with different substitutional break schedule data may be defined for the playback break.

The substitutional selection for a slot may differ between a live break and a playback break, even with the same break schedule data. The selection may depend on the time of playback. For example, if more than a certain period, such as 7 days, has elapsed since the time of broadcast, substitution may be enabled and the linear media item inhibited, or vice versa. One or more of the linear or substitutional media items may have predetermined expiry times, specified for example by the break schedule data and/or campaign metadata, after which they may not be shown on playback.

The time of day of playback may be taken into account, so that media items having watershed restrictions may not be selected outside the defined watershed times. Campaigns may have defined time periods after which they cannot be selected for output. If no other substitutional media items are available, an additional media item may be selected, as described above.

Similar approaches may be applied to a PVOD (Push Video on Demand) system, in which broadcast programmes are recorded automatically without specific selection by the user, as described for example in WO-A-06/125971.

Reporting

It is also important to determine, or at least reliably estimate, the ratings of each campaign, in other words how many times the campaign has actually been displayed, and optionally, to how many viewers of the target demographic profile of the campaign. In a conventional linear advertising model, survey evidence is used to estimate the viewing figures for each channel at a particular time, and the ratings for a particular campaign are derived from those figures. In a substitutional advertising model, additional information is needed to apportion those figures to each of the substitutional options within a slot S, particularly if one substitutional slot contains options from different campaigns.

If the segments of each of the campaigns within a pod P do not overlap, the selection of the campaign to be output for each slot by the receiver 1 is deterministic, given the profile data stored in each receiver 1. It is therefore possible to determine or at least estimate the rating of each campaign, without detecting which campaigns have been output by a particular receiver 1. Instead, all that is necessary is to determine or estimate the number of receivers 1 tuned to each broadcast channel, and the profile data of those receivers. In one example, viewing data 7 comprising data sets of the form [Subscriber ID], [Channel], [Time of Day] is sufficient; this data may be collected by the profile management function 11 and combined with information from the aggregation function to determine which campaigns would have been output by each receiver. This viewing data may be reported through return channels from the receivers 1, or obtained from survey evidence. In this way, the amount of data to be collected is minimised, and the accuracy of reporting improved.

Splicing Architecture

As described above, in response to a splice event, the receiver 1 outputs a locally stored substitutional media item at a splice point defined as a splice event in a broadcast or playback stream. Architectures that enable transport stream level splicing at the receiver 1 will now be described.

Figure 10:
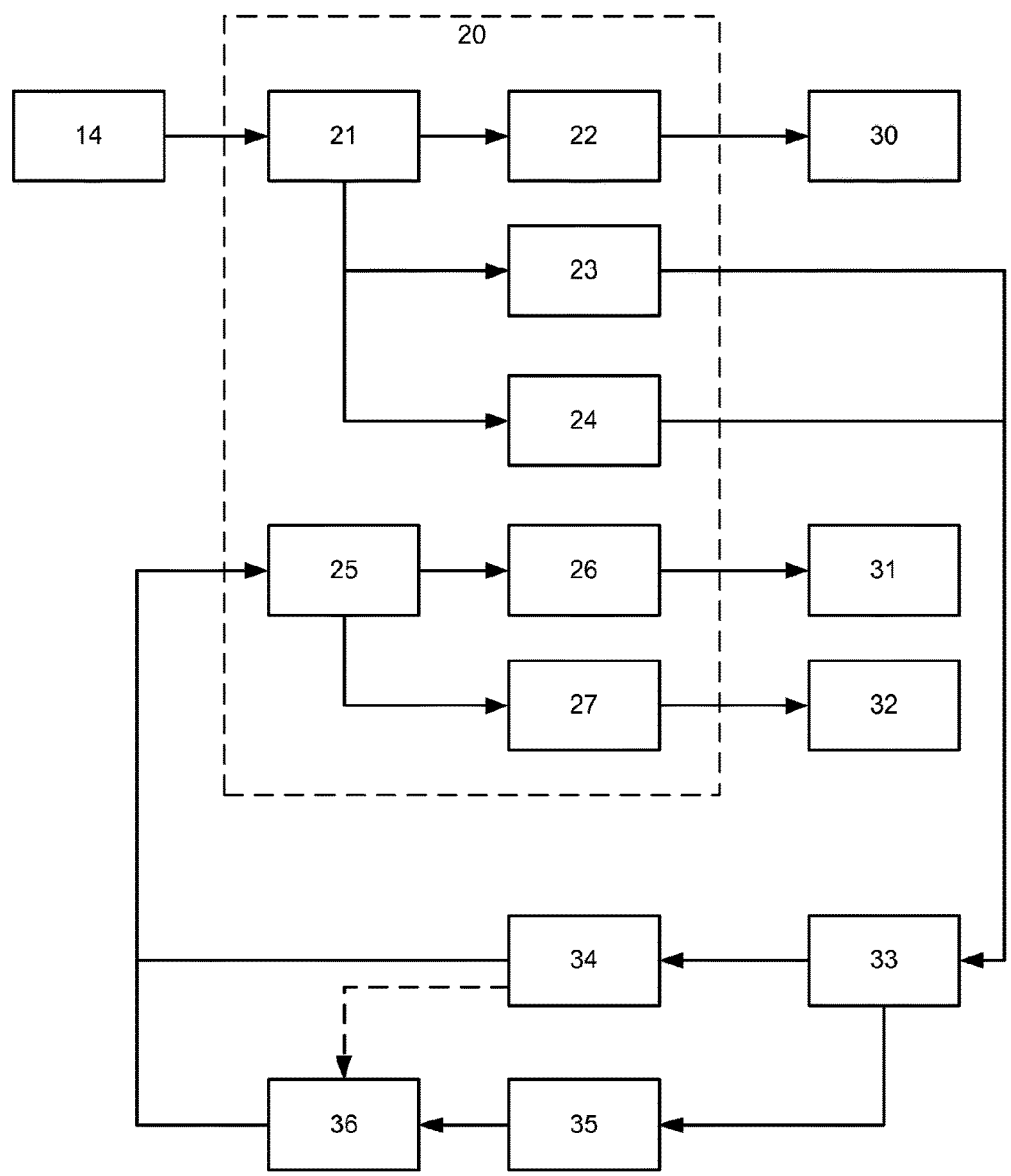
FIG. 10 is a diagram of a first embodiment of a splicing architecture.

In a first embodiment shown in FIG. 10, data is parsed at transport stream level, time stamp information is modified, and the modified transport streams are reinjected into a demultiplexer 20. The demultiplexer 20 is of a conventional architecture in which a demodulated audiovisual transport stream 14 is provided to a demultiplexer input 21 and demultiplexed into data 22, such as Teletext data, a video packetized elementary stream (PES) 26 and an audio PES 27, for output to middleware 30, video decoder 31 and audio decoder 32 respectively. The demultiplexer 20 also outputs a video time stamp (TS) 23 and an audio TS 24, parsed from the transport stream 14.

In the first embodiment, the video and audio TS 23, 24 are input to a PTS trigger 33 which detects a discontinuity in the TS 23, 24, caused for example by splicing a substitutional media item into the transport stream 14. If a discontinuity is detected, a substitute video and audio TS 35 are generated and adapted to the original TS references 34 to generate an adapted TS 36 which is continuous with the time references before the discontinuity. The adapted TS 36 are then reinjected to a TS input 25 so that the output video and audio PES 26, 27 have the adapted TS 36. In this way, the video and audio decoders 31 and 32 do not encounter the TS discontinuity.

Figure 11:
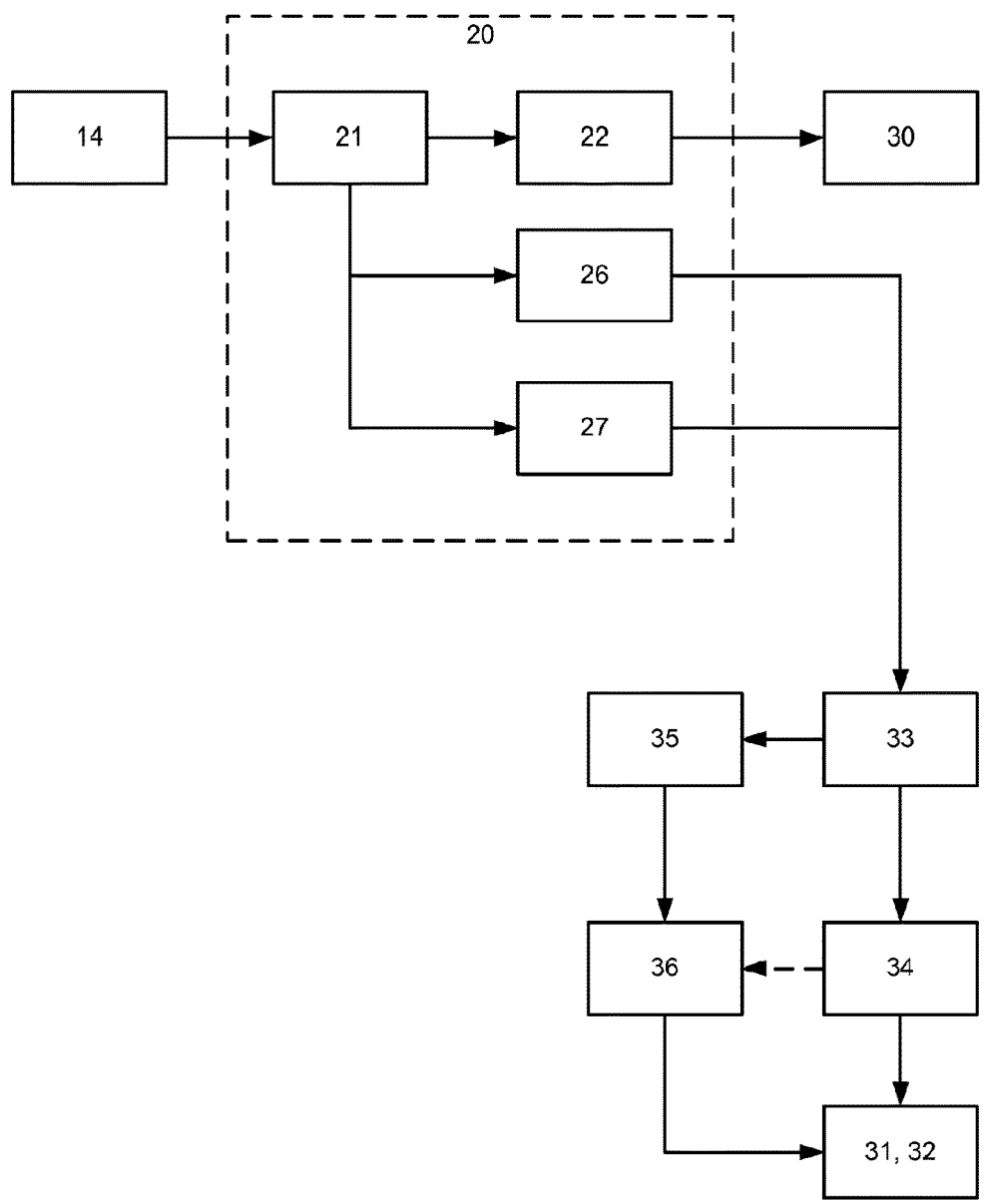
FIG. 11 is a diagram of a second embodiment of a splicing architecture.

In a second embodiment shown in FIG. 11, the audio and video PES 26, 27 and processed between the demultiplexer 20 and the audio/video encoders 31, 32. As a result, the second embodiment is simpler than the first embodiment and provides lower latency, since the need for a second pass through the demultiplexer 20 is avoided.

In the second embodiment, the audio and video PES 26 and 27 are provided to the PTS trigger 33, which detects discontinuities in the TS contained within the PES in a similar fashion to the first embodiment. If a discontinuity is detected, substitute PES 35 are generated and an adapted PES 36 is created with TS references continuous with those of the PES 34 before the discontinuity. The adapted PES 36 is output to the video and audio decoders 31, 32.

In either embodiment, scrambled and/or encrypted transports streams 14 may need to be descrambled/decrypted at the same stage as the demultiplexer 20, so that the TS can be parsed and modified.

Splicing Point Selection

In an embodiment of the invention, splicing points are defined with reference to the presentation time stamps (PTS) that are required for audio/video synchronization and are common to the audio and video streams of a particular input (e.g. broadcast or playback) stream. Thus, a single splicing point can be defined for both audio and video using the same reference.

To avoid decoding problems with interframe coded video, the splicing points are defined so that there are no interframe references across a splice point; for example, there are no forward references before a splice point and no backward references after a splice point. Preferably, splice points are defined between groups of frames where there are no references between groups, such as at the beginning of an I-frame (an independent frame) in a Group of Pictures (GOP) in MPEG-2.

Each substitutional media item is encoded independently, so does not contain any interframe references outside itself. Thus, an MPEG-2 encoded substitutional media item will contain one or more complete GOPs and will start with an I-frame.

In one embodiment, splice points are selected at the head end 2, and transmitted by the programme broadcast function 10. An advantage of this approach is that the receiver 1 does not need to parse an MPEG stream, for example to suspend MPEG decoding until the start of the next GOP.

Figure 12:
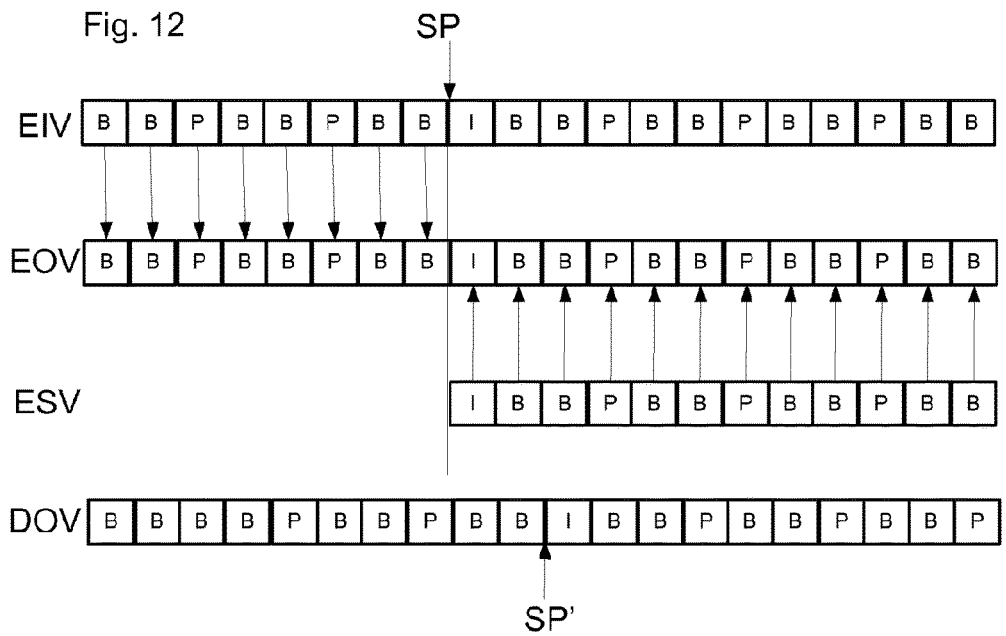
FIG. 12 is a diagram of the frame timing of encoded input, substitutional and output video in a first splicing embodiment.

Each GOP is preferably encapsulated within exactly one PES packet. This ensures that a splice point always occurs at the beginning of a GOP: the PTS value is placed in a PES packet header, which therefore indicates the beginning of a GOP. An additional advantage is that a Payload Unit Start Indicator (PUSI) bit in the transport stream header can be used to parse the stream so as to identify the beginning of a GOP, without having to read the frame type from the Elementary Stream level, thus reducing the level of processing resource required. As shown in FIG. 12, a splice point SP is defined at the beginning of an I frame of an encoded input video stream EIV. An encoded substitutional video stream ESV is spliced in at that point, also beginning with an I frame. The resultant encoded output video stream EOV comprises the frames of the encoded input video stream EIV up to the splice point SP, and the frames of the encoded substitutional video ESV after the splice point SP. The decoded output video stream DOV is delayed from the encoded output video stream EOV because of decoding latency, so that the timing of the splice point SP' in the decoded output video DOV is delayed relative to the indicated splice point SP.

Figure 13:
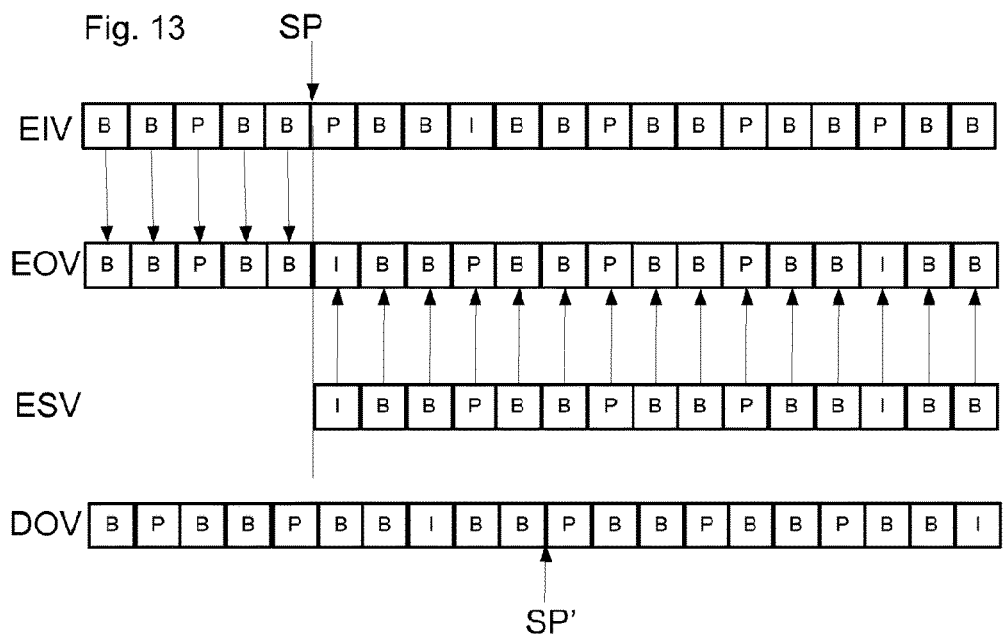
FIG. 13 is a diagram of the frame timing of encoded input, substitutional and output video in a second splicing embodiment.

In an alternative embodiment, each PES packet contains a single video frame, so each frame has its own PTS. This allows a splice point to be defined at any frame within a GOP, but the splice point must be selected so that decoding is not disrupted across the splice point. For example, a splice-in point may be defined after a P frame in the encoded input video EIV, since the P-frame encoding only depends on previous frames. FIG. 13 shows an example similar to that of FIG. 12, but with the splice point within a GOP.

A splice-out point should preferably be defined at a GOP boundary; otherwise, the receiver 1 would need to delay the splice-out until the next GOP in the encoded input video EIV; this could lead to a gap or frozen frame from the end of the substitutional video for a short period of time—up to half a second for MPEG2 encoding, or potentially several seconds for H.264. This would also require the receiver 1 to parse the output encoded video stream EOV to identify a GOP start point, which is undesirable because of the need for additional processing resources at the receiver 1, and the need to customize the receiver platform at a hardware/driver level.

Preferably, the following requirements should be met at the head end 9 to ensure seamless splicing:

- the first frame of the input encoded video EIV after the splice-in point should be an I-frame
- the first frame of the input encoded video EIV after the splice-in point should be placed at the beginning of a new PES packet, and contain a PTS value
- the first frame of the input encoded video EIV after the splice-out point should be an I-frame
- the first frame of the input encoded video EIV after the splice-out point should be placed at the beginning of a new PES packet, and contain a PTS value
- the input encoded video stream EIV should used closed GOPs i.e. the frames of one GOP do not reference any frame of another GOP
- the last frame of the encoded substitutional video must not reference a future frame i.e. for MPEG2, it must be a P-frame or I-frame the length of the encoded substitutional video ESV must be equal to the interval between the splice-in and splice-out points If any of the above requirements is not met, splicing is still possible but may not be seamless. The following effects may be visible to the user:

freezing of last frame of the output video for up to a full GOP length at the beginning and/or end of the splicing interval.

up to a full GOP of substitutional video might be dropped at the beginning and/or end of the splicing interval.

up to a full GOP of unselected content might be visible at the beginning and/or end of the splicing interval.

If there are multiple adjacent splicing intervals, these problems may be compounded.

Although the above embodiments have been exemplified with reference to MPEG-2 video encoding, aspects of the invention are applicable to other video encoding formats, such as H.264.

Audio Splicing

A particular problem may occur with decoding of the audio stream, in that the audio decoder 32 may not be managed within the receiver 1, but instead by an external amplifier to which no information is available of when any splicing may occur in the audio stream it receives. It is therefore desirable to ensure that the audio frame rate and synchronization remains continuous at the output to an external audio decoder 32 during substitution, to avoid any problems caused by the external amplifier receiving out-of-sync frames.

Figure 14:
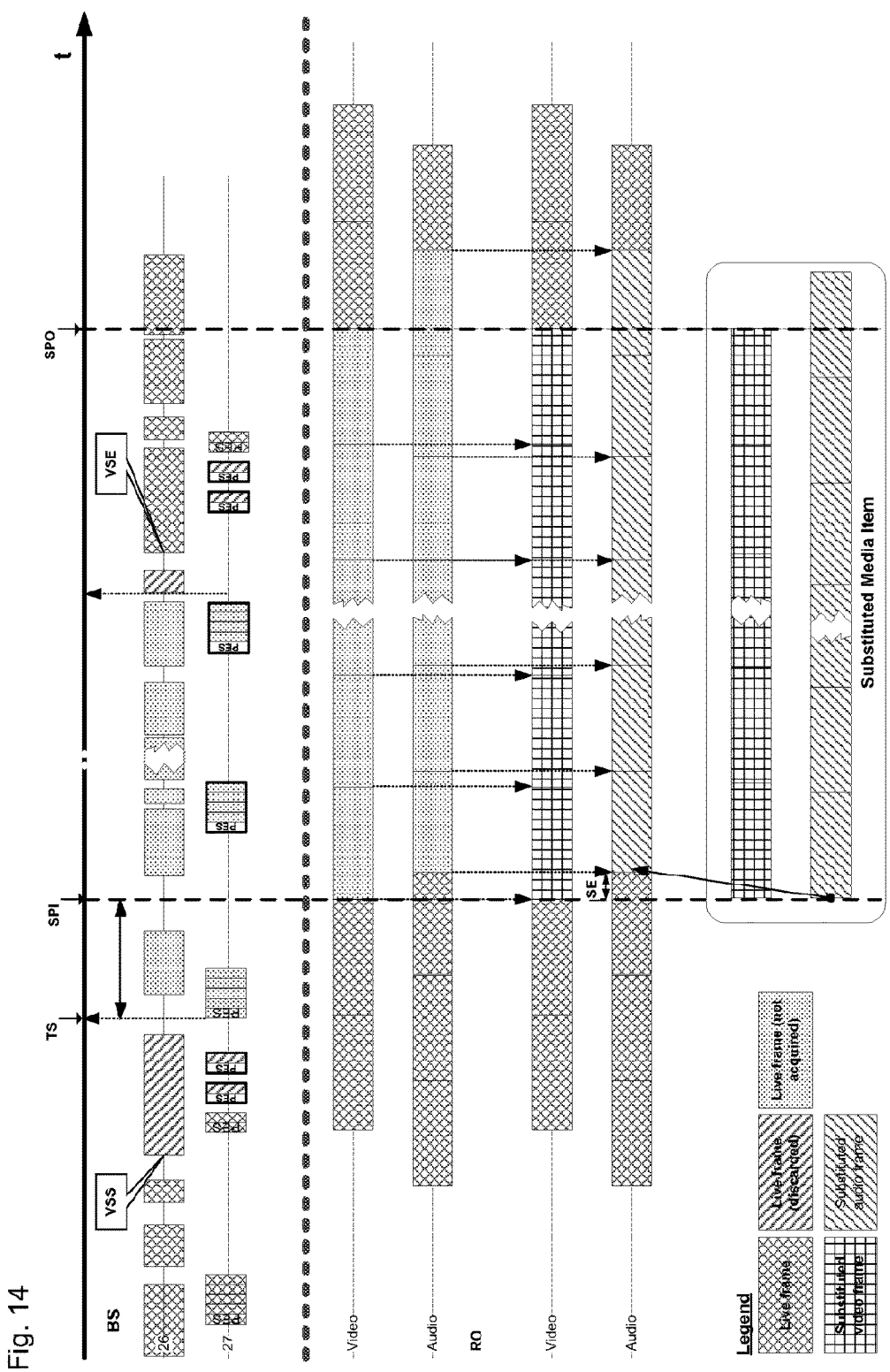
FIG. 14 is a diagram of a broadcast stream and corresponding receiver output in an embodiment of the invention.

FIG. 14 illustrates a broadcast stream BS comprising audio and video packet elementary streams 26, 27, comprising packets including presentation time stamps (PTS) indicating the time at which the contents are to be presented, for example as output by the receiver 1, and splice insert messages VSS (video splice start) and VSE (Video Splice End). The actual timing of the video splice points is indicated as SPI (Splice Point In) and SPO (Splice Point Out). FIG. 14 also illustrates the corresponding receiver output RO, comprising audio and video frames.

One problem stems from the fact that video frame and audio frame length do not align: each video frame covers a period of 40 ms for example, while an AC3 audio frame carries audio samples for a period of up to 32 ms. This means that the PTS value referencing the actual video splice point in an splicing message will not exactly match the PTS value of the PES carrying the AC-3 frame in the stream in which the splice will be applied.

To overcome this problem, the receiver 1 determines the actual PTS value of the related audio frame having a PTS value equal to, or the smallest value greater than, the video PTS value for the video splice start and end VSS, VSE. Normally, an audio frame comes later than the associated video frame in the transport stream; this audio frame is therefore monitored in the live transport stream, past the video splice point PES, especially for a splicing from live to playback, to determine the audio splice point.

It is possible that the point when the PES for the last component appears in the stream is too close to the presentation time where the substitution must start, not leaving enough time for the receiver 1 to operate the substitution on time. The receiver 1 may then switch from the broadcast stream earlier and miss outputting one or more broadcast frames, as shown in FIG. 14. In that case, the receiver 1 will have to ensure it maintains a consistent audio frame rate in compensating the exact number of missing frames at the receiver output, by generating mute frames locally, before the substitution starts.

Similarly, the receiver 1 may output locally generated mute frames before an audio splice-out point, if the spliced-in content finishes before the indicated audio splice-out point. A muted audio output is preferable to problems that may be caused by unsynchronized audio.

The actual size of the mute frame will be fixed, based on the audio sampling rate parameter specified in the broadcast channel.

A further problem is that the misalignment between the video and the audio frames in the broadcast stream is likely not to be the same as that in the substitutional content. To overcome this problem, the audio frame timing of the substitutional content output to the audio decoder is aligned with that of the broadcast stream. This may cause a synchronization error SE between the audio and video of the substitutional content during playback, since the timing of the audio frames has been shifted relative, but this effect is preferable to the unknown errors that may be caused in external decoders by timing discontinuity.

Splice Point Signalling

As discussed above with reference to FIG. 1, the headend 2 includes a media broadcast function 9 which encodes media content for broadcast, based on scheduling information provided by a scheduling function 8. The media broadcast function 9 includes splice insert messages in the broadcast stream, which signal the precise video frame at which a splice point will occur, with reference to a frame timing indicated by the PTS for each frame. Each splice insert message is preferably inserted in the broadcast stream at a fixed interval before the occurrence of the splice point.

The timings of the splice points are signalled to the media broadcast function 9 by the scheduling function 8, with reference to a common clock. However, the scheduling function 8 has no knowledge of the frame timing of the encoded frames output by the media broadcast function 9. The encoder must perform a conversion between the reference to the common clock made by the scheduling function to signal the time when the splice point frame will be presented to the encoder and the frame timing that will be associated with the video splice point frame at the output of the encoder, but if the encoder is not properly synchronised to the common clock used by the scheduling function 9, the splice insert messages may refer to the start of a frame just before or just after the splice point timing signalled by the scheduling function. This can lead for example to one frame of a linear media item being displayed at receiver 1 before a substitutional media item is displayed.

To overcome this problem, the frame timing of the encoder is synchronized with the clock reference of the scheduling function 8. This may require the scheduling function 8 to output a clock signal to the encoder for synchronization purposes, or alternatively both the scheduling function 8 and the encoder may be synchronized to a common clock reference.

For the case where the scheduling function 8 outputs a clock signal to the encoder, the method comprises inserting the UTC (Coordinated Universal Time) time at which the frame is played out and sent to the input of the encoder in the VITC (Vertical Interval Time Code) field of the frame. The encoder can then set a clock that accurately locates the time boundary at which each frame is received. The encoder will then be able to more properly calculate in advance the frame timing associated with any time reference in the future provided by the scheduling function.

Receiver Details

Figure 15:
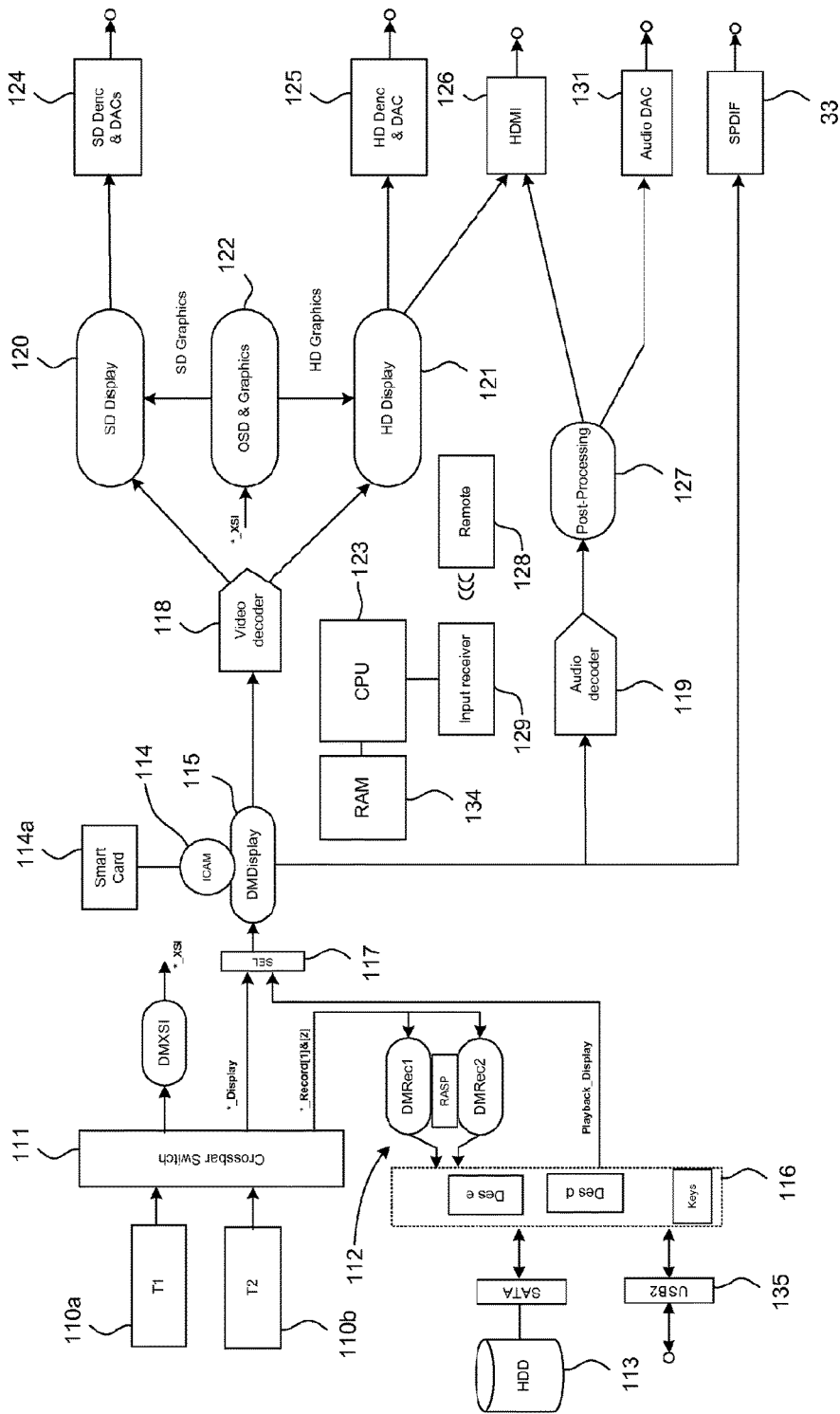
FIG. 15 is a diagram of the functional components of a specific embodiment of the receiver.

FIG. 15 shows in detail the functional components of the receiver 1 in specific embodiments of the invention. In this example, received signals are input to first and second tuners 110a and 110b but any number of tuners may be used in the receiver 1. The tuners 110a and 110b are tuneable into the same or different channels of the satellite television broadcast network for simultaneous reception of the same or different television programmes and/or media items. Signals from the first and second tuners 110a and 110b are passed to a crossbar switch 111 which separates the data received from the first and second tuners 10a and 10b into data for direct output to a television, data representing received television programmes for recording and subsequent playback, and user services and programme scheduling data, in accordance with the XSI standard, for example. The receiver 1 has a hard disk (or other storage medium) 113 which receives from the crossbar switch 111 compressed video and/or audio data for recording and subsequent playback via recording and playback circuitry 116. In the embodiment illustrated in FIG. 15, the receiver 1 includes two demultiplexer recording pipes (DMRec1 and DMRec2), which are coupled to Random Access Streaming Protocol circuitry (RASP) for analysing data in a received stream and indexing the data as it is received. The recording and playback circuitry 116 is also configured to perform decryption of received data, for example before the video and audio data is transmitted for playback on a display, using stored decryption keys according to the encryption technique used to encrypt the received data.

The received signals comprise digitally encoded data. In this example, the data is compressed using the Digital Video Broadcast/Moving Pictures Expert Group 2 or 4 (DVB/MPEG 2/4) or H.264 standard which permits both programme data and additional data (for example metadata and/or schedule data) to be transmitted in a single channel. The hard disk 113 receives and stores compressed data. The data is decompressed only after retrieval from the hard disk 113.

Satellite (and indeed cable) programmes are usually scrambled to restrict access to authorised users e.g. subscribers. The receiver 1 therefore has an Integrated Conditional Access Module (ICAM) 114 which co-operates with a smart card 114a to determine whether the viewer has subscribed to a particular channel and is therefore authorised to access the channel. Parental control over channel access is also provided, at least in part, by the access control circuit 114. The receiver 1 further comprises a demultiplexing and descrambling circuit 115 which receives from a selector 117 data from the crossbar switch 111 for direct output or data from the hard disk 113 for playback. The demultiplexing and descrambling circuit 115 separates the data into video data and audio data for distribution to various locations within the receiver 1. The demultiplexing and descrambling circuit 115 is also controlled by the access control circuit 114 to enable the descrambling of the signal by authorised subscribers. The receiver 1 also comprises a video decoder 118 for decompression and processing of encoded video data received from the demultiplexing and descrambling circuit 115, and an audio decoder 119 for decompression and processing of compressed audio data, operating according to the MPEG 2/4 standard, for example.

Decompressed video data is supplied to standard definition display circuitry 120 and/or high definition display circuitry 121 which combines the decompressed video data with corresponding standard definition or high definition on-screen display and graphics generated by on-screen display and graphics generation circuitry 122 using the user services and programme scheduling data. The standard definition display circuitry 120 provides the combined standard definition video and graphics data to a standard definition digital encoder and Digital to Analogue Converters (DACs) 124 where the data is encoded and converted into an appropriate format for direct input to a television set. The high definition display circuitry 121 supplies the combined high definition video and graphics data to a high definition digital encoder and Digital to Analogue Converter (DAC) 125 where the data is encoded into an appropriate high definition format for output to a high definition TV if so desired. The combined high definition video and graphics data is also supplied to a High Definition Multimedia Interface (HDMI) interface 126 which also receives decompressed audio data from the audio decoder 119 via audio post-processing circuitry 127, for output to an HDMI input of a high definition TV if so desired. Decompressed and processed audio data is also supplied to an audio DAC 131 for direct input to an analogue audio device or speakers. The demultiplexing and descrambling circuit 115 may also output compressed digital audio to a proprietary audio interface 133, for example in accordance with the Sony/Philips Digital Interconnect Format (SPDIF), for direct input to appropriate audio equipment.

The receiver 1 is controlled by a processor 123 which communicates with the various units of the receiver via a bus (not shown). The processor 123 has associated with it Random Access Memory (RAM) 134. The processor 123 controls operation of the receiver 1 by tuning the tuners 110a and 110b to receive signals for the desired channels by controlling the demultiplexing, descrambling and decompression so that the desired programme and/or interactive service data is displayed on the screen of the TV, and by controlling the hard disk 113 to record desired television programmes or to play back previously recorded television programmes. Viewer selection of desired programmes and customer services is controlled by viewer manipulation of a remote control unit 128, which in response to such viewer manipulation transmits control signals to an input receiver 129 for input to the processor 123. The remote control unit 128 also allows the viewer to control of the operation of the hard disk 13 to record television programmes, to play back recorded television programmes and to program the recording of television programmes, etc.

Operation of the receiver 1 is controlled by software that makes the processor 123 responsive to control signals from the remote control unit 128 and/or additional data in the received signals. Interaction between hardware and software in the receiver 1 may include functionality as described in detail in the Applicant's earlier international patent application published as WO 01/11865. Operation of the receiver 1 in receiving and decoding data representing television programmes and data defining scheduling and other information related to the programmes may include functionality as described in detail in the Applicant's earlier international patent application published as WO 96/37996. Operation of the receiver 1 in providing interactive services may include functionality as described in the Applicant's earlier international patent application published as WO 97/23997.

Within the Digital Video Broadcasting (DVB) standard for digital television broadcast there exists a standard for the transmission of schedule information such that it can be decoded and presented correctly to subscribers in the form of an Electronic Programme Guide (EPG). This DVB standard is known generally as the SI standard and can be found in the specification: ETS 300 468, ETSI Digital Broadcasting Systems for Television, Sound and Data Services; Specification for Service Information (SI) in Digital Video Broadcasting (DVB) Systems 2nd edition. Guidelines for using the specification are given in ETSI ETR 211-DVB SI Guidelines. The receiver 1 is preferably designed to support the SI specification.

In addition to operating data for use in controlling access to channels, additional data in a channel can include brief programme schedule data representative of so-called event information tables (EITs) defining the scheduling of programmes in each channel. The programme schedule data may be stored in the RAM 134 and, once stored, the scheduling information is available effectively instantaneously. Alternatively, the programme schedule data may be stored in the hard disk 113. The programme schedule data is transmitted regularly so that the receiver 1 will be updated substantially continuously. As those skilled in the art will appreciate, the transmitted information may be brief to enable each channel to carry a reduced set of programme schedule data without excessive overheads in terms of bandwidth requirements in each channel and memory requirements in the receiver.

In addition, a dedicated EPG channel transmits more detailed programme scheduling information, such as programme synopsis or other ancillary data associated with the scheduled programmes, which is stored in the hard disk 113. The receiver 1 is arranged to display the programme scheduling information for several of the channels over a predetermined period of time on the TV. Also, a viewer can interact with the receiver 1 to program recordings of television programmes, view a desired part of the available programme schedule, etc., on the basis of the information received via the dedicated EPG channel.

Since the tuners 10a and 10b can be tuned to receive different channels, it is possible for a first television programme in one channel to be displayed on a TV and recorded on the hard disk 13, while at the same time a second television programme in another channel is also recorded on the hard disk 13. Operation of the receiver 1 in providing simultaneous recording and playback may be as described in the Applicant's earlier international patent application published as WO 01/11865.

The hard disk 113 of the receiver 1 may be similar to conventional hard disks used in computer systems for storing large amounts of data. The hard disk 113 may have a capacity of many gigabytes (e.g. 400 gigabytes or more) and receive video and audio data via a SATA interface, for example, for storage in the compressed form in which it is received, for example, in accordance with the DVB/MPEG 2 standards as discussed above. This allows for the storage of several hours of television programmes (e.g. 100+ hours) on the hard disk 113. The hard disk 113 may comprise two or more storage areas, one for the storage of television programme data, and the other for storing metadata and/or recorded media items. The processor 123 controls the operation of the hard disk 113. More specifically, the processor 123 controls the recording and playback of television programmes to and from the hard disk 113. Other processors (not shown) can be used to control the hard disk 113 as appropriate.

The receiver 1 also includes an external interface 135, such as a Universal Serial Bus 2 (USB2) port. The USB2 interface may be connected to a transcoding device (not shown) via a USB connector, which allows media content in a first format to be supplied from the receiver 1 and transcoded by the connected transcoding device into a second media coding format suitable for playback on a Personal Media Player (not shown). Operation of the receiver 1 in providing transcoding services may be as described in the Applicant's earlier international patent application published as WO 06/125999.

Computer System

Figure 16:
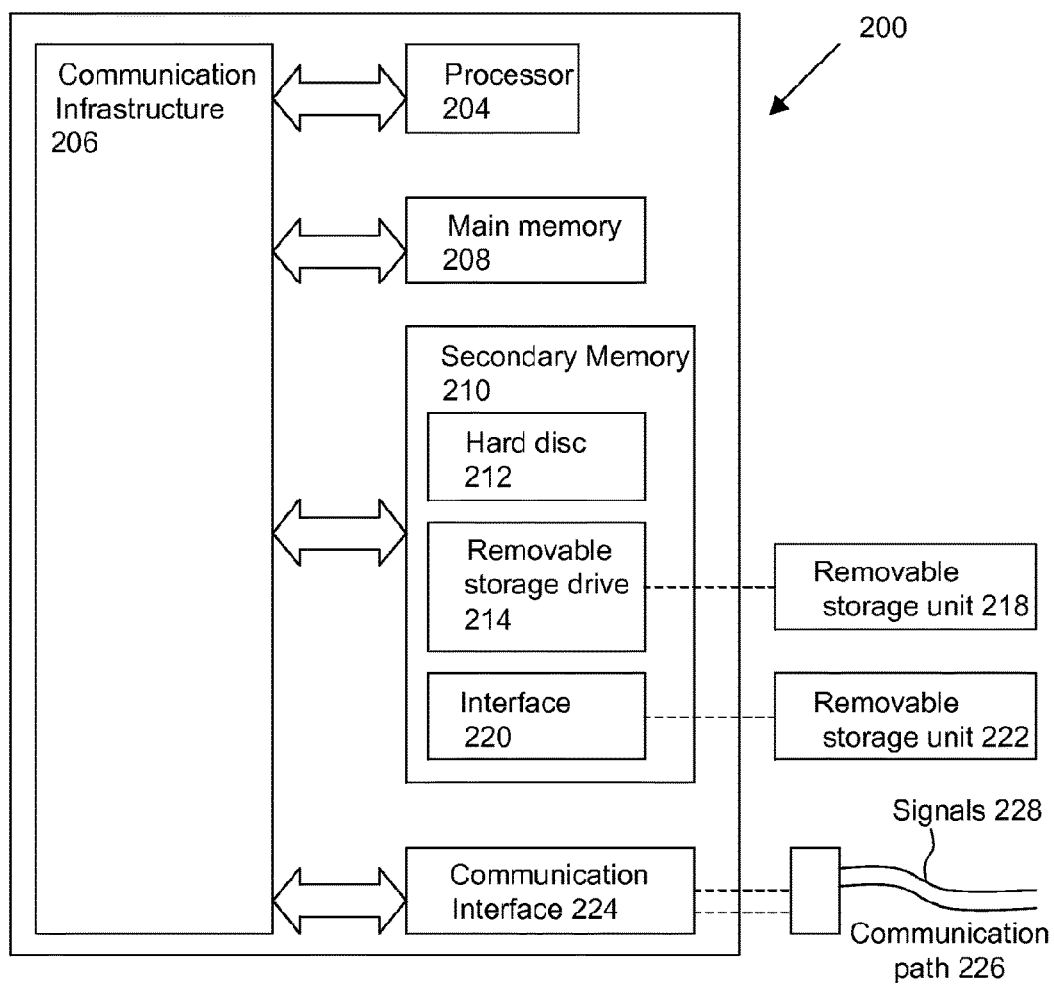
FIG. 16 is a diagram of the functional components of a specific embodiment of a computer system in embodiments of the invention.

The entities described herein, such as the scheduling function 8 and/or the profile management function, may be implemented by computer systems such as computer system 200 as shown in FIG. 16. Embodiments of the present invention may be implemented as programmable code for execution by such computer systems 200. After reading this description, it will become apparent to a person skilled in the art how to implement the invention using other computer systems and/or computer architectures.

Computer system 200 includes one or more processors, such as processor 204. Processor 204 may be any type of processor, including but not limited to a special purpose or a general-purpose digital signal processor. Processor 204 is connected to a communication infrastructure 206 (for example, a bus or network). Various software implementations are described in terms of this exemplary computer system. After reading this description, it will become apparent to a person skilled in the art how to implement the invention using other computer systems and/or computer architectures.

Computer system 200 also includes a main memory 208, preferably random access memory (RAM), and may also include a secondary memory 610. Secondary memory 210 may include, for example, a hard disk drive 212 and/or a removable storage drive 214, representing a floppy disk drive, a magnetic tape drive, an optical disk drive, etc. Removable storage drive 214 reads from and/or writes to a removable storage unit 218 in a well-known manner. Removable storage unit 218 represents a floppy disk, magnetic tape, optical disk, etc., which is read by and written to by removable storage drive 214. As will be appreciated, removable storage unit 618 includes a computer usable storage medium having stored therein computer software and/or data.

In alternative implementations, secondary memory 210 may include other similar means for allowing computer programs or other instructions to be loaded into computer system 200. Such means may include, for example, a removable storage unit 222 and an interface 220. Examples of such means may include a program cartridge and cartridge interface (such as that previously found in video game devices), a removable memory chip (such as an EPROM, or PROM, or flash memory) and associated socket, and other removable storage units 222 and interfaces 220 which allow software and data to be transferred from removable storage unit 222 to computer system 200. Alternatively, the program may be executed and/or the data accessed from the removable storage unit 222, using the processor 204 of the computer system 200.

Computer system 200 may also include a communication interface 224. Communication interface 224 allows software and data to be transferred between computer system 200 and external devices. Examples of communication interface 224 may include a modem, a network interface (such as an Ethernet card), a communication port, a Personal Computer Memory Card International Association (PCMCIA) slot and card, etc. Software and data transferred via communication interface 224 are in the form of signals 228, which may be electronic, electromagnetic, optical, or other signals capable of being received by communication interface 224. These signals 228 are provided to communication interface 224 via a communication path 226. Communication path 226 carries signals 228 and may be implemented using wire or cable, fibre optics, a phone line, a wireless link, a cellular phone link, a radio frequency link, or any other suitable communication channel. For instance, communication path 226 may be implemented using a combination of channels.

The terms "computer program medium" and "computer usable medium" are used generally to refer to media such as removable storage drive 214, a hard disk installed in hard disk drive 212, and signals 228. These computer program products are means for providing software to computer system 200. However, these terms may also include signals (such as electrical, optical or electromagnetic signals) that embody the computer program disclosed herein.

Computer programs (also called computer control logic) are stored in main memory 208 and/or secondary memory 210. Computer programs may also be received via communication interface 224. Such computer programs, when executed, enable computer system 200 to implement embodiments of the present invention as discussed herein. Accordingly, such computer programs represent controllers of computer system 200. Where the embodiment is implemented using software, the software may be stored in a computer program product and loaded into computer system 200 using removable storage drive 214, hard disk drive 212, or communication interface 224, to provide some examples.

Alternative embodiments may be implemented as control logic in hardware, firmware, or software or any combination thereof.

Alternative Embodiments

The above embodiment is described with reference to a broadcast system, such as a satellite, cable or Internet broadcast system. Aspects of the invention are also applicable to a video on demand (VOD) or push video on demand (PVOD) system, in which a programme is received and/or displayed on demand, and includes one or more substitutional slots as part of the programme. The substitutional system may be applied to the substitutional system in a similar way to the broadcast system described above.

The above embodiment is described with reference to substitutional advertising, but aspects of the invention are not dependent on the content or commercial nature of advertising. Substitutional systems as described above are applicable to other media types having other constraint and/or optimisation rules. For example, aspects of the invention are applicable to the distribution of programmes with substitutional segments, for example to allow display of alternative content depending on profile data at the receiver. In that case, there may be constraint rules which restrict which combination of segments can be output. In another example, aspects of the invention are applicable to public service or system announcements targeted at particular user profiles.

The above embodiment discloses a video broadcast system in which broadcast programmes and substitutional media content comprise video, and associated audio where applicable. However, aspects of the invention are applicable to audio-only content, such as digital radio broadcasts, or a mixture of video and audio-only content; for example, the broadcast programmes may be video programmes, and the substitutional media content may comprise audio-only content that is output over a still picture generated locally at the receiver.

The above embodiment discloses a time-divided system in which the insertable media items are output during breaks within or between programmes. However, the slots for insertable media items may be concurrent in time with programmes; for example, substitutional content may be superimposed on the display of a programme, or be added to or replace the audio output, for example for dubbing.

The substitutional media items are described in the specific embodiments above as comprising audio and/or video clips, but may alternatively or additionally comprise data and/or instructions that, when executed by the receiver 1, cause audio and/or video content to be output: for example, video items may be defined as 2D or 3D graphical objects, and audio items may be defined as musical instructions, such as MIDI files, or speech synthesis codes.

Alternative embodiments may be envisaged, which nevertheless fall within the scope of the following claims.

The invention claimed is:

1. A method of selecting a plurality of media items, each for output by a program receiver in a corresponding one of a plurality of slots in a program break, the method comprising, at the program receiver:
   a. receiving, from a broadcast channel, a plurality of lists, each list having been allocated by a central scheduler to a respective one of said plurality of slots and identifying one or more corresponding possible media items scheduled for output in said respective one of the plurality of slots; and
   b. selecting, from the corresponding one of said lists, for each of said plurality of slots, up to one of the corresponding possible media items for output in the corresponding slot;
   wherein:
      each list is identified only with the respective one of the plurality of slots to which said list is allocated, is not identified with another one of the plurality of slots, and is not used for selection of media items for another one of the plurality of slots, and
      the selecting includes selecting a media item that is available from local storage at the program receiver by resolving one or more constraints associated with one or more of the media items scheduled for output in at least another one of the plurality of slots within the program break.

2. The method of claim 1, wherein the program receiver selects from ones of the possible media items that match profile data associated with the program receiver.

3. The method of claim 1, wherein the program receiver selects from ones of the possible media items stored and available for output at the program receiver.

4. The method of claim 3, wherein the media items available for output at the program receiver are previously received over a broadcast channel.

5. The method of claim 1, further comprising receiving one or more unscheduled media items not allocated to a specific slot, and selecting one of the unscheduled media items for output in said program slot.

6. The method of claim 5, wherein the unscheduled media item is selected for output in said program slot according to one or more constraints associated with one or more media items for output in at least one other slot.

7. The method of claim 1, wherein the one or more constraints are associated with one or more media items previously selected for output in the at least one other slot.

8. The method of claim 1, wherein the one or more constraints are associated with one or more media items output in at least one previous slot.

9. The method of claim 1, wherein the one of the possible media items is selected for output in the slot on the basis of priority data associated with at least some of the possible media items for that slot.

10. The method of claim 1, wherein up to one of the possible media items is selected for output based on previous output of at least one of the possible media items by the program receiver.

11. The method of claim 1, wherein one of said media items is selected for output in the slot by satisfying one or more constraints associated with that slot.

12. The method of claim 1, wherein the possible media items include a linear media item included within a program stream.

13. The method of claim 1, wherein the media items are broadcast to the program receiver.

14. The method as in claim 1, wherein the processor selects in accordance with a priority rating of the possible media items within the corresponding one of the lists.

15. The method as in claim 14, wherein the priority rating of the possible media items is determined by the order in which the possible media items are indicated in the corresponding one of the lists.

16. The method as in claim 14, wherein the priority rating of the possible media items is determined by a specific rating value associated with each of possible media items in the corresponding one of the lists.

17. A substitutional media system comprising:
   a. media item transmitter that transmits a plurality of media items to a plurality of media receivers;
   b. central scheduler that schedules sets of the media items for output in one of a plurality of corresponding slots within a program break to produce a plurality of lists, each list having been allocated by the central scheduler to a respective one of said plurality of slots and identifying one or more corresponding possible media items scheduled for output in said respective one of the plurality of slots; and
   c. broadcast transmitter that broadcasts the plurality of lists to the plurality of media receivers;
   wherein:
      each list is identified only with the respective one of the plurality of slots to which said list is allocated, is not identified with another one of the plurality of slots, and is not used for selection of media items for another one of the plurality of slots, and
      each of said plurality of media receivers receives the plurality of lists and, from each said list, selects up to one of the corresponding possible media items for output in the corresponding slot by selecting a media item that is available from local storage at the program receiver such that selecting includes satisfying one or more constraints associated with one or more of the media items scheduled for output in at least another one of the plurality of slots within the program break.

18. The system of claim 17, wherein the media item transmitter is a broadcast transmitter.

19. The system of claim 17, further including a program transmitter for transmitting programs to said receivers, the slots being defined with reference to said transmitted programs.

20. The system of claim 19, wherein the program transmitter is a program broadcast transmitter.

21. The system as in claim 17, wherein the processor selects in accordance with a priority rating of the possible media items within the corresponding one of the lists.

22. The system as in claim 21, wherein the priority rating of the possible media items is determined by the order in which the possible media items are indicated in the corresponding one of the lists.

23. The system as in claim 21, wherein the priority rating of the possible media items is determined by a specific rating value associated with each of possible media items in the corresponding one of the lists.

24. A program product embodied on a non-transitory computer-readable carrier medium containing a computer program executable by a processor of a program receiver to perform a method of selecting a plurality of media items, each for output in a corresponding one of a plurality of slots in a program break, the method comprising, at the program receiver:
   receiving a plurality of lists from a broadcast channel, each list corresponding to a respective one of said plurality of slots and identifying one or more corresponding possible media items scheduled for output in said respective one of the plurality of slots at the program receiver; and
   selecting, for each of said plurality of slots, up to one of the possible media items for output in the corresponding slot;
   wherein:
      each list is identified only with the respective one of the plurality of slots to which said list is allocated, is not identified with another one of the plurality of slots, and is not used for selection of media items for another one of the plurality of slots, and
      the selecting includes determining a media item is available from local storage at the program receiver and resolving one or more constraints associated with one or more of the media items scheduled for output in at least another one of the plurality of slots within the program break.

25. The program product as in claim 24, wherein the processor selects in accordance with a priority rating of the possible media items within the corresponding one of the lists.

26. The program product as in claim 25, wherein the priority rating of the possible media items is determined by the order in which the possible media items are indicated in the corresponding one of the lists.

27. The program product as in claim 25, wherein the priority rating of the possible media items is determined by a specific rating value associated with each of possible media items in the corresponding one of the lists.

28. A program receiver apparatus comprising:
   a processor; and
   a receiver that receives, from a broadcast channel, a program including data that identifies a plurality of slots within a program break and receives a plurality of lists, each list corresponding to a respective one of said plurality of slots and identifying one or more corresponding possible media items scheduled for output in said respective one of the plurality of slots;
   wherein:
      each list is identified only with the respective one of the plurality of slots to which said list is allocated, is not identified with another one of the plurality of slots, and is not used for selection of media items for another one of the plurality of slots, and
      the processor selects, for each of said plurality of slots, up to one of the corresponding possible media items for output in the corresponding slot, determines a media item is available from local storage at the program receiver by resolving one or more constraints associated with one or more of the media items scheduled for output in at least another one of the plurality of slots within the program break.

29. The apparatus as in claim 28, wherein the processor selects in accordance with a priority rating of the possible media items within the corresponding one of the lists.

30. The apparatus as in claim 29, wherein the priority rating of the possible media items is determined by the order in which the possible media items are indicated in the corresponding one of the lists.

31. The apparatus as in claim 29, wherein the priority rating of the possible media items is determined by a specific rating value associated with each of possible media items in the corresponding one of the lists.

* * * * *